United States Patent
Nguyen

(10) Patent No.: US 12,440,769 B2
(45) Date of Patent: *Oct. 14, 2025

(54) METHOD AND SYSTEM FOR AUTHENTICATING MOBILE SERVERS FOR PLAY OF GAMES OF CHANCE

(71) Applicant: Aristocrat Technologies, Inc. (ATI), Las Vegas, NV (US)

(72) Inventor: Binh T. Nguyen, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/074,676

(22) Filed: Dec. 5, 2022

(65) Prior Publication Data

US 2023/0097050 A1 Mar. 30, 2023

Related U.S. Application Data

(63) Continuation of application No. 17/321,502, filed on May 17, 2021, now Pat. No. 11,571,627, which is a
(Continued)

(51) Int. Cl.
*A63F 13/71* (2014.01)
*A63F 13/335* (2014.01)
(Continued)

(52) U.S. Cl.
CPC ............ *A63F 13/71* (2014.09); *A63F 13/335* (2014.09); *G07F 17/3218* (2013.01);
(Continued)

(58) Field of Classification Search
CPC ........ A63F 13/71; A63F 13/335; A63F 13/73; G07F 17/3218; G07F 17/3223;
(Continued)

(56) References Cited

U.S. PATENT DOCUMENTS 2,033,638 A 3/1936 Koppl
2,062,923 A 12/1936 Pal
(Continued)

FOREIGN PATENT DOCUMENTS

GB 2033638 A 5/1980
GB 2062923 A 5/1981
(Continued)

OTHER PUBLICATIONS

Office Action for U.S. Appl. No. 13/296,182, dated Dec. 23, 2015.
(Continued)

*Primary Examiner* — Carl V Larsen
(74) *Attorney, Agent, or Firm* — Weaver Austin Villeneuve & Sampson LLP

(57) ABSTRACT

A system for authenticating mobile servers comprises at least one mobile server configured to support games of chance; and an authentication server configured to: assign an authentication identifier to each of the at least one mobile server and at least one backup mobile server; pre-authenticate the at least one backup mobile server; and authenticate the at least one mobile server for at least one of a predetermined period of time or a predetermined geographical area.

17 Claims, 6 Drawing Sheets

Related U.S. Application Data continuation of application No. 15/811,654, filed on Nov. 13, 2017, now Pat. No. 11,020,669, which is a continuation of application No. 14/217,066, filed on Mar. 17, 2014, now Pat. No. 9,814,970.

(60) Provisional application No. 61/794,913, filed on Mar. 15, 2013.

(51) Int. Cl.
| | |
|---|---|
| *G07F 17/32* | (2006.01) |
| *H04W 12/06* | (2021.01) |
| *H04W 12/082* | (2021.01) |
| *H04W 64/00* | (2009.01) |
| *A63F 13/73* | (2014.01) |
| *H04L 9/40* | (2022.01) |
| *H04W 12/12* | (2021.01) |
| *H04W 12/63* | (2021.01) |
| *H04W 12/64* | (2021.01) |

(52) U.S. Cl.
CPC ...... *G07F 17/3223* (2013.01); *G07F 17/3241* (2013.01); *H04W 12/06* (2013.01); *H04W 12/082* (2021.01); *H04W 64/003* (2013.01); *A63F 13/73* (2014.09); *H04L 63/0846* (2013.01); *H04W 12/12* (2013.01); *H04W 12/63* (2021.01); *H04W 12/64* (2021.01)

(58) Field of Classification Search
CPC . G07F 17/3241; H04W 12/06; H04W 12/082; H04W 64/003; H04W 12/12; H04W 12/63; H04W 12/64; H04L 63/0846
See application file for complete search history.

(56) References Cited

U.S. PATENT DOCUMENTS

| | | | |
|---|---|---|---|
| 4,741,539 A | 5/1988 | Sutton | |
| 4,948,138 A | 8/1990 | Pease | |
| 4,969,183 A | 11/1990 | Reese | |
| 5,067,712 A | 11/1991 | Georgilas | |
| 5,275,400 A | 1/1994 | Weingardt | |
| 5,429,361 A | 7/1995 | Raven | |
| 5,489,103 A | 2/1996 | Okamoto | |
| 5,618,232 A | 4/1997 | Martin | |
| 5,630,757 A | 5/1997 | Gagin | |
| 5,655,961 A | 8/1997 | Acres | |
| 5,704,835 A | 1/1998 | Dietz, II | |
| 5,727,786 A | 3/1998 | Weingardt | |
| 5,833,537 A | 11/1998 | Barrie | |
| 5,842,921 A | 12/1998 | Mindes | |
| 5,919,091 A | 7/1999 | Bell | |
| 5,947,820 A | 9/1999 | Morro | |
| 5,997,401 A | 12/1999 | Crawford | |
| 6,001,016 A | 12/1999 | Walker | |
| 6,039,648 A | 3/2000 | Guinn | |
| 6,059,289 A | 5/2000 | Vancura | |
| 6,089,977 A | 7/2000 | Bennett | |
| 6,095,920 A | 8/2000 | Sadahiro | |
| 6,110,041 A | 8/2000 | Walker | |
| 6,142,872 A | 11/2000 | Walker | |
| 6,146,271 A | 11/2000 | Kadlic | |
| 6,146,273 A | 11/2000 | Olsen | |
| 6,165,071 A | 12/2000 | Weiss | |
| 6,231,445 B1 | 5/2001 | Acres | |
| 6,244,958 B1 | 6/2001 | Acres | |
| 6,270,412 B1 | 8/2001 | Crawford | |
| 6,290,600 B1 | 9/2001 | Glasson | |
| 6,293,866 B1 | 9/2001 | Walker | |
| 6,353,390 B1 | 3/2002 | Beri | |
| 6,364,768 B1 | 4/2002 | Acres | |
| 6,404,884 B1 | 6/2002 | Marwell | |
| 6,416,406 B1 | 7/2002 | Duhamel | |
| 6,416,409 B1 | 7/2002 | Jordan | |
| 6,443,452 B1 | 9/2002 | Brune | |
| 6,491,584 B2 | 12/2002 | Graham | |
| 6,500,067 B1 | 12/2002 | Luciano | |
| 6,505,095 B1 | 1/2003 | Kolls | |
| 6,508,710 B1 | 1/2003 | Paravia | |
| 6,529,706 B1 * | 3/2003 | Mitchell | H04B 7/18508 709/227 |
| 6,561,900 B1 | 5/2003 | Baerlocher | |
| 6,592,457 B1 | 7/2003 | Frohm | |
| 6,612,574 B1 | 9/2003 | Cole | |
| 6,620,046 B2 | 9/2003 | Rowe | |
| 6,641,477 B1 | 11/2003 | Dietz, II | |
| 6,645,078 B1 | 11/2003 | Mattice | |
| 6,675,152 B1 | 1/2004 | Prasad | |
| 6,699,128 B1 | 3/2004 | Beadell | |
| 6,719,630 B1 | 4/2004 | Seelig | |
| 6,749,510 B2 | 6/2004 | Giobbi | |
| 6,758,757 B2 | 7/2004 | Luciano, Jr. | |
| 6,773,345 B2 | 8/2004 | Walker | |
| 6,778,820 B2 | 8/2004 | Tendler | |
| 6,780,111 B2 | 8/2004 | Cannon | |
| 6,799,032 B2 | 9/2004 | McDonnell | |
| 6,800,027 B2 | 10/2004 | Giobbi | |
| 6,804,763 B1 | 10/2004 | Stockdale | |
| 6,811,486 B1 | 11/2004 | Luciano, Jr. | |
| 6,843,725 B2 | 1/2005 | Nelson | |
| 6,846,238 B2 | 1/2005 | Wells | |
| 6,848,995 B1 | 2/2005 | Walker | |
| 6,852,029 B2 | 2/2005 | Baltz | |
| 6,869,361 B2 | 3/2005 | Sharpless | |
| 6,875,106 B2 | 4/2005 | Weiss | |
| 6,884,170 B2 | 4/2005 | Rowe | |
| 6,884,172 B1 | 4/2005 | Lloyd | |
| 6,902,484 B2 | 6/2005 | Idaka | |
| 6,908,390 B2 | 6/2005 | Nguyen | |
| 6,913,532 B2 | 7/2005 | Baerlocher | |
| 6,923,721 B2 | 8/2005 | Luciano | |
| 6,935,958 B2 | 8/2005 | Nelson | |
| 6,949,022 B1 | 9/2005 | Showers | |
| 6,955,600 B2 | 10/2005 | Glavich | |
| 6,971,956 B2 | 12/2005 | Rowe | |
| 6,984,174 B2 | 1/2006 | Cannon | |
| 6,997,803 B2 | 2/2006 | Lemay | |
| 7,018,292 B2 | 3/2006 | Tracy | |
| 7,032,115 B2 | 4/2006 | Kashani | |
| 7,033,276 B2 | 4/2006 | Walker | |
| 7,035,626 B1 | 4/2006 | Luciano, Jr. | |
| 7,037,195 B2 | 5/2006 | Schneider | |
| 7,048,628 B2 | 5/2006 | Schneider | |
| 7,048,630 B2 | 5/2006 | Berg | |
| 7,063,617 B2 | 6/2006 | Brosnan | |
| 7,076,329 B1 | 7/2006 | Kolls | |
| 7,089,264 B1 | 8/2006 | Guido | |
| 7,094,148 B2 | 8/2006 | Baerlocher | |
| 7,105,736 B2 | 9/2006 | Laakso | |
| 7,111,141 B2 | 9/2006 | Nelson | |
| 7,124,426 B1 * | 10/2006 | Tsuria | H04H 20/62 725/77 |
| 7,144,321 B2 | 12/2006 | Mayeroff | |
| 7,152,783 B2 | 12/2006 | Charrin | |
| 7,169,041 B2 | 1/2007 | Tessmer | |
| 7,169,052 B2 | 1/2007 | Beaulieu | |
| 7,175,523 B2 | 2/2007 | Gilmore | |
| 7,181,228 B2 | 2/2007 | Boesch | |
| 7,182,690 B2 | 2/2007 | Giobbi | |
| 7,198,571 B2 | 4/2007 | Lemay | |
| RE39,644 E | 5/2007 | Alcorn | |
| 7,217,191 B2 | 5/2007 | Cordell | |
| 7,243,104 B2 | 7/2007 | Bill | |
| 7,247,098 B1 | 7/2007 | Bradford | |
| 7,259,718 B2 | 8/2007 | Patterson | |
| 7,275,989 B2 | 10/2007 | Moody | |
| 7,285,047 B2 | 10/2007 | Gelb | |
| 7,311,608 B1 | 12/2007 | Danieli | |
| 7,314,408 B2 | 1/2008 | Cannon | |
| 7,316,615 B2 | 1/2008 | Soltys | |
| 7,316,619 B2 | 1/2008 | Nelson | |
| 7,318,775 B2 | 1/2008 | Brosnan | |

(56) References Cited

U.S. PATENT DOCUMENTS

| | | |
|---|---|---|
| 7,326,116 B2 | 2/2008 | O'Donovan |
| 7,330,108 B2 | 2/2008 | Thomas |
| 7,346,358 B2 | 3/2008 | Wood |
| 7,355,112 B2 | 4/2008 | Laakso |
| 7,384,338 B2 | 6/2008 | Rothschild |
| 7,387,571 B2 | 6/2008 | Walker |
| 7,393,278 B2 | 7/2008 | Gerson |
| 7,396,990 B2 | 7/2008 | Lu |
| 7,415,426 B2 | 8/2008 | Williams |
| 7,425,177 B2 | 9/2008 | Rodgers |
| 7,427,234 B2 | 9/2008 | Soltys |
| 7,427,236 B2 | 9/2008 | Kaminkow |
| 7,427,708 B2 | 9/2008 | Ohmura |
| 7,431,650 B2 | 10/2008 | Kessman |
| 7,448,949 B2 | 11/2008 | Kaminkow |
| 7,500,913 B2 | 3/2009 | Baerlocher |
| 7,510,474 B2 | 3/2009 | Carter, Sr. |
| 7,513,828 B2 | 4/2009 | Nguyen |
| 7,519,838 B1 | 4/2009 | Suurballe |
| 7,559,838 B2 | 7/2009 | Walker |
| 7,563,167 B2 | 7/2009 | Walker |
| 7,572,183 B2 | 8/2009 | Olivas |
| 7,585,222 B2 | 9/2009 | Muir |
| 7,602,298 B2 | 10/2009 | Thomas |
| 7,607,174 B1 | 10/2009 | Kashchenko |
| 7,611,409 B2 | 11/2009 | Muir |
| 7,637,810 B2 | 12/2009 | Amaitis |
| 7,644,861 B2 | 1/2010 | Alderucci |
| 7,653,757 B1 | 1/2010 | Fernald |
| 7,693,306 B2 | 4/2010 | Huber |
| 7,699,703 B2 | 4/2010 | Muir |
| 7,722,453 B2 | 5/2010 | Lark |
| 7,742,996 B1 | 6/2010 | Kwan |
| 7,758,423 B2 | 7/2010 | Foster |
| 7,771,271 B2 | 8/2010 | Walker |
| 7,780,529 B2 | 8/2010 | Rowe |
| 7,780,531 B2 | 8/2010 | Englman |
| 7,785,192 B2 | 8/2010 | Canterbury |
| 7,811,172 B2 | 10/2010 | Asher |
| 7,819,749 B1 | 10/2010 | Fish |
| 7,822,688 B2 | 10/2010 | Labrou |
| 7,828,652 B2 | 11/2010 | Nguyen |
| 7,828,654 B2 | 11/2010 | Carter, Sr. |
| 7,828,661 B1 | 11/2010 | Fish |
| 7,850,528 B2 | 12/2010 | Wells |
| 7,874,919 B2 | 1/2011 | Paulsen |
| 7,877,798 B2 | 1/2011 | Saunders |
| 7,883,413 B2 | 2/2011 | Paulsen |
| 7,892,097 B2 | 2/2011 | Muir |
| 7,909,692 B2 | 3/2011 | Nguyen |
| 7,909,699 B2 | 3/2011 | Parrott |
| 7,918,728 B2 | 4/2011 | Nguyen |
| 7,927,211 B2 | 4/2011 | Rowe |
| 7,927,212 B2 | 4/2011 | Hedrick |
| 7,951,008 B2 | 5/2011 | Wolf |
| 8,057,298 B2 | 11/2011 | Nguyen |
| 8,057,303 B2 | 11/2011 | Rasmussen |
| 8,087,988 B2 | 1/2012 | Nguyen |
| 8,117,608 B1 | 2/2012 | Slettehaugh |
| 8,133,113 B2 | 3/2012 | Nguyen |
| 8,182,326 B2 | 5/2012 | Speer, II |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen |
| 8,231,456 B2 | 7/2012 | Zielinski |
| 8,235,803 B2 | 8/2012 | Loose |
| 8,276,010 B2 | 9/2012 | Vavilala |
| 8,282,475 B2 | 10/2012 | Nguyen |
| 8,323,099 B2 | 12/2012 | Durham |
| 8,337,290 B2 | 12/2012 | Nguyen |
| 8,342,946 B2 | 1/2013 | Amaitis |
| 8,393,948 B2 | 3/2013 | Allen |
| 8,403,758 B2 | 3/2013 | Hornik |
| 8,430,745 B2 | 4/2013 | Agarwal |
| 8,461,958 B2 | 6/2013 | Saenz |
| 8,465,368 B2 | 6/2013 | Hardy |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether |
| 8,613,659 B2 | 12/2013 | Nelson |
| 8,678,901 B1 | 3/2014 | Kelly |
| 8,696,470 B2 | 4/2014 | Nguyen |
| 8,745,417 B2 | 6/2014 | Huang |
| 8,821,255 B1 | 9/2014 | Friedman |
| 8,834,254 B2 | 9/2014 | Buchholz |
| 8,843,752 B1 | 9/2014 | Priyadarshi |
| 8,858,323 B2 | 10/2014 | Nguyen |
| 8,864,586 B2 | 10/2014 | Nguyen |
| 8,942,995 B1 | 1/2015 | Kerr |
| 9,039,507 B2 | 5/2015 | Allen |
| 9,235,952 B2 | 1/2016 | Nguyen |
| 9,292,996 B2 | 3/2016 | Davis |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,530,277 B2 | 12/2016 | Nelson |
| 9,576,425 B2 | 2/2017 | Nguyen |
| 9,626,826 B2 | 4/2017 | Nguyen |
| 9,666,015 B2 | 5/2017 | Acres |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 * | 11/2017 | Nguyen ............ G07F 17/3223 |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi |
| 10,068,429 B2 | 9/2018 | Gagner |
| 10,115,270 B2 | 10/2018 | Gagner |
| 10,140,816 B2 | 11/2018 | Nguyen |
| 10,325,447 B2 | 6/2019 | Malek |
| 10,421,010 B2 | 9/2019 | Nguyen |
| 10,438,446 B2 | 10/2019 | Nguyen |
| 10,445,978 B2 | 10/2019 | Nguyen |
| 10,818,133 B2 | 10/2020 | Nguyen |
| 11,020,669 B2 * | 6/2021 | Nguyen ............ G07F 17/3223 |
| 11,571,627 B2 * | 2/2023 | Nguyen ................ A63F 13/71 |
| 2001/0004607 A1 | 6/2001 | Olsen |
| 2001/0016516 A1 | 8/2001 | Takatsuka |
| 2001/0024971 A1 | 9/2001 | Brossard |
| 2001/0025272 A1 | 9/2001 | Mori |
| 2001/0031659 A1 | 10/2001 | Perrie |
| 2001/0047291 A1 | 11/2001 | Garahi |
| 2002/0006822 A1 | 1/2002 | Krintzman |
| 2002/0042295 A1 | 4/2002 | Walker |
| 2002/0043759 A1 | 4/2002 | Vancura |
| 2002/0045474 A1 | 4/2002 | Singer |
| 2002/0107065 A1 | 8/2002 | Rowe |
| 2002/0111210 A1 | 8/2002 | Luciano |
| 2002/0111213 A1 | 8/2002 | McEntee |
| 2002/0113369 A1 | 8/2002 | Weingardt |
| 2002/0116615 A1 | 8/2002 | Nguyen |
| 2002/0133418 A1 | 9/2002 | Hammond |
| 2002/0137217 A1 | 9/2002 | Rowe |
| 2002/0142825 A1 | 10/2002 | Lark |
| 2002/0145051 A1 | 10/2002 | Charrin |
| 2002/0147047 A1 | 10/2002 | Letovsky |
| 2002/0147049 A1 | 10/2002 | Carter |
| 2002/0151366 A1 | 10/2002 | Walker |
| 2002/0152120 A1 | 10/2002 | Howington |
| 2002/0167536 A1 | 11/2002 | Valdes |
| 2002/0177483 A1 | 11/2002 | Cannon |
| 2002/0183105 A1 | 12/2002 | Cannon |
| 2003/0001338 A1 | 1/2003 | Bennett |
| 2003/0003996 A1 | 1/2003 | Nguyen |
| 2003/0004871 A1 | 1/2003 | Rowe |
| 2003/0008696 A1 | 1/2003 | Abecassis |
| 2003/0013531 A1 | 1/2003 | Rowe |

(56) References Cited

U.S. PATENT DOCUMENTS

| | | |
|---|---|---|
| 2003/0027635 A1 | 2/2003 | Walker |
| 2003/0064805 A1 | 4/2003 | Wells |
| 2003/0064807 A1 | 4/2003 | Walker |
| 2003/0078094 A1 | 4/2003 | Gatto |
| 2003/0092480 A1 | 5/2003 | White |
| 2003/0100361 A1 | 5/2003 | Sharpless |
| 2003/0104860 A1 | 6/2003 | Cannon |
| 2003/0104865 A1 | 6/2003 | Itkis |
| 2003/0148809 A1 | 8/2003 | Nelson |
| 2003/0162588 A1 | 8/2003 | Brosnan |
| 2003/0195024 A1 | 10/2003 | Slattery |
| 2003/0199295 A1 | 10/2003 | Vancura |
| 2003/0224852 A1 | 12/2003 | Walker |
| 2003/0224854 A1 | 12/2003 | Joao |
| 2004/0002386 A1 | 1/2004 | Wolfe |
| 2004/0005919 A1 | 1/2004 | Walker |
| 2004/0023709 A1 | 2/2004 | Beaulieu |
| 2004/0023716 A1 | 2/2004 | Gauselmann |
| 2004/0038736 A1 | 2/2004 | Bryant |
| 2004/0048650 A1 | 3/2004 | Mierau |
| 2004/0068460 A1 | 4/2004 | Feeley |
| 2004/0082384 A1 | 4/2004 | Walker |
| 2004/0082385 A1 | 4/2004 | Silva |
| 2004/0094624 A1 | 5/2004 | Fernandes |
| 2004/0098578 A1* | 5/2004 | Funayama ............ G06F 1/3246 713/2 |
| 2004/0106449 A1 | 6/2004 | Walker |
| 2004/0127277 A1 | 7/2004 | Walker |
| 2004/0127290 A1 | 7/2004 | Walker |
| 2004/0137987 A1 | 7/2004 | Nguyen |
| 2004/0142744 A1 | 7/2004 | Atkinson |
| 2004/0147308 A1 | 7/2004 | Walker |
| 2004/0152508 A1 | 8/2004 | Lind |
| 2004/0179502 A1* | 9/2004 | Naghian ................ H04L 63/08 370/433 |
| 2004/0199631 A1 | 10/2004 | Natsume |
| 2004/0214622 A1 | 10/2004 | Atkinson |
| 2004/0224753 A1 | 11/2004 | O'Donovan |
| 2004/0229671 A1 | 11/2004 | Stronach |
| 2004/0256803 A1 | 12/2004 | Ko |
| 2004/0259633 A1 | 12/2004 | Gentles |
| 2005/0003890 A1 | 1/2005 | Hedrick |
| 2005/0004980 A1 | 1/2005 | Vadjinia |
| 2005/0026696 A1 | 2/2005 | Hashimoto |
| 2005/0033651 A1 | 2/2005 | Kogan |
| 2005/0043996 A1 | 2/2005 | Silver |
| 2005/0054446 A1 | 3/2005 | Kammler |
| 2005/0101376 A1 | 5/2005 | Walker |
| 2005/0101383 A1 | 5/2005 | Wells |
| 2005/0130728 A1 | 6/2005 | Nguyen |
| 2005/0130731 A1 | 6/2005 | Englman |
| 2005/0137014 A1 | 6/2005 | Vetelainen |
| 2005/0143169 A1 | 6/2005 | Nguyen |
| 2005/0167921 A1 | 8/2005 | Finocchio |
| 2005/0170883 A1 | 8/2005 | Muskin |
| 2005/0181865 A1 | 8/2005 | Luciano, Jr. |
| 2005/0181870 A1 | 8/2005 | Nguyen |
| 2005/0181875 A1 | 8/2005 | Hoehne |
| 2005/0187020 A1 | 8/2005 | Amaitis |
| 2005/0202865 A1 | 9/2005 | Kim |
| 2005/0202875 A1 | 9/2005 | Murphy |
| 2005/0208993 A1 | 9/2005 | Yoshizawa |
| 2005/0209002 A1 | 9/2005 | Blythe |
| 2005/0221881 A1 | 10/2005 | Lannert |
| 2005/0223219 A1 | 10/2005 | Gatto |
| 2005/0239546 A1 | 10/2005 | Hedrick |
| 2005/0255919 A1 | 11/2005 | Nelson |
| 2005/0273635 A1 | 12/2005 | Wilcox |
| 2005/0277471 A1 | 12/2005 | Russell |
| 2005/0282637 A1 | 12/2005 | Gatto |
| 2006/0009283 A1 | 1/2006 | Englman |
| 2006/0035707 A1 | 2/2006 | Nguyen |
| 2006/0036874 A1 | 2/2006 | Cockerille |
| 2006/0046822 A1 | 3/2006 | Kaminkow |
| 2006/0046830 A1 | 3/2006 | Webb |
| 2006/0046849 A1 | 3/2006 | Kovacs |
| 2006/0068893 A1 | 3/2006 | Jaffe |
| 2006/0068897 A1 | 3/2006 | Sanford |
| 2006/0073869 A1 | 4/2006 | Lemay |
| 2006/0073888 A1 | 4/2006 | Nguyen |
| 2006/0073897 A1 | 4/2006 | Englman |
| 2006/0079317 A1 | 4/2006 | Flemming |
| 2006/0121972 A1 | 6/2006 | Walker |
| 2006/0126529 A1 | 6/2006 | Hardy |
| 2006/0148551 A1 | 7/2006 | Walker |
| 2006/0189382 A1 | 8/2006 | Muir |
| 2006/0217170 A1 | 9/2006 | Roireau |
| 2006/0217193 A1 | 9/2006 | Walker |
| 2006/0234700 A1* | 10/2006 | Funderburk ............ H04H 20/62 455/431 |
| 2006/0247028 A1 | 11/2006 | Brosnan |
| 2006/0247035 A1 | 11/2006 | Rowe |
| 2006/0252530 A1 | 11/2006 | Oberberger |
| 2006/0253481 A1 | 11/2006 | Guido |
| 2006/0256135 A1 | 11/2006 | Aoyama |
| 2006/0281525 A1 | 12/2006 | Borissov |
| 2006/0281541 A1 | 12/2006 | Nguyen |
| 2006/0287106 A1 | 12/2006 | Jensen |
| 2007/0004510 A1 | 1/2007 | Underdahl |
| 2007/0026935 A1 | 2/2007 | Wolf |
| 2007/0026942 A1* | 2/2007 | Kinsley ............... G07F 17/3269 463/29 |
| 2007/0054739 A1 | 3/2007 | Amaitis |
| 2007/0060254 A1 | 3/2007 | Muir |
| 2007/0060306 A1* | 3/2007 | Amaitis ................ G07F 17/32 463/25 |
| 2007/0060319 A1 | 3/2007 | Block |
| 2007/0060358 A1 | 3/2007 | Amaitis |
| 2007/0077981 A1 | 4/2007 | Hungate |
| 2007/0087833 A1 | 4/2007 | Feeney |
| 2007/0087834 A1 | 4/2007 | Moser |
| 2007/0091858 A1* | 4/2007 | Wu ....................... H04L 63/107 370/338 |
| 2007/0093299 A1 | 4/2007 | Bergeron |
| 2007/0129155 A1 | 6/2007 | Eryou |
| 2007/0129148 A1 | 6/2007 | Van Luchene |
| 2007/0149279 A1 | 6/2007 | Norden |
| 2007/0149286 A1 | 6/2007 | Bemmel |
| 2007/0159301 A1 | 7/2007 | Hirt |
| 2007/0161402 A1 | 7/2007 | Ng |
| 2007/0184896 A1 | 8/2007 | Dickerson |
| 2007/0184904 A1 | 8/2007 | Lee |
| 2007/0191109 A1 | 8/2007 | Crowder, Jr. |
| 2007/0207852 A1 | 9/2007 | Nelson |
| 2007/0207854 A1 | 9/2007 | Wolf |
| 2007/0235521 A1 | 10/2007 | Mateen |
| 2007/0238505 A1 | 10/2007 | Okada |
| 2007/0241187 A1 | 10/2007 | Alderucci |
| 2007/0248036 A1 | 10/2007 | Nevalainen |
| 2007/0257430 A1 | 11/2007 | Hardy |
| 2007/0259713 A1 | 11/2007 | Fiden |
| 2007/0259716 A1 | 11/2007 | Mattice |
| 2007/0259717 A1 | 11/2007 | Mattice |
| 2007/0265984 A1 | 11/2007 | Santhana |
| 2007/0270213 A1 | 11/2007 | Nguyen |
| 2007/0275777 A1 | 11/2007 | Walker |
| 2007/0275779 A1 | 11/2007 | Amaitis |
| 2007/0281782 A1 | 12/2007 | Amaitis |
| 2007/0281785 A1 | 12/2007 | Amaitis |
| 2007/0298858 A1 | 12/2007 | Toneguzzo |
| 2007/0298873 A1 | 12/2007 | Nguyen |
| 2008/0015032 A1 | 1/2008 | Bradford |
| 2008/0020824 A1 | 1/2008 | Cuddy |
| 2008/0020845 A1 | 1/2008 | Low |
| 2008/0032787 A1 | 2/2008 | Low |
| 2008/0069105 A1* | 3/2008 | Costa ................ H04W 12/0431 370/392 |
| 2008/0070652 A1 | 3/2008 | Nguyen |
| 2008/0070681 A1 | 3/2008 | Marks |
| 2008/0076505 A1 | 3/2008 | Nguyen |
| 2008/0076506 A1 | 3/2008 | Nguyen |
| 2008/0076548 A1 | 3/2008 | Paulsen |
| 2008/0076572 A1 | 3/2008 | Nguyen |
| 2008/0096650 A1 | 4/2008 | Baerlocher |

(56) References Cited

U.S. PATENT DOCUMENTS

| | | |
|---|---|---|
| 2008/0102916 A1 | 5/2008 | Kovacs |
| 2008/0102935 A1 | 5/2008 | Finnimore |
| 2008/0102956 A1 | 5/2008 | Burman |
| 2008/0102957 A1 | 5/2008 | Burman |
| 2008/0108401 A1 | 5/2008 | Baerlocher |
| 2008/0108437 A1* | 5/2008 | Kaarela ............... H04L 67/1061 463/43 |
| 2008/0113772 A1 | 5/2008 | Burrill |
| 2008/0119267 A1 | 5/2008 | Denlay |
| 2008/0126529 A1 | 5/2008 | Kim |
| 2008/0139306 A1 | 6/2008 | Lutnick |
| 2008/0146321 A1 | 6/2008 | Parente |
| 2008/0146344 A1 | 6/2008 | Rowe |
| 2008/0150902 A1 | 6/2008 | Edpalm |
| 2008/0153583 A1 | 6/2008 | Huntley |
| 2008/0161110 A1 | 7/2008 | Campbell |
| 2008/0167106 A1 | 7/2008 | Lutnick |
| 2008/0167118 A1 | 7/2008 | Kroeckel |
| 2008/0167130 A1 | 7/2008 | Kroeckel |
| 2008/0182667 A1 | 7/2008 | Davis |
| 2008/0200251 A1 | 8/2008 | Alderucci |
| 2008/0207307 A1 | 8/2008 | Cunningham, II |
| 2008/0214258 A1 | 9/2008 | Brosnan |
| 2008/0214310 A1 | 9/2008 | Brunet De Courssou |
| 2008/0215319 A1 | 9/2008 | Lu |
| 2008/0234047 A1 | 9/2008 | Nguyen |
| 2008/0238610 A1 | 10/2008 | Rosenberg |
| 2008/0248849 A1 | 10/2008 | Lutnick |
| 2008/0248865 A1 | 10/2008 | Tedesco |
| 2008/0252419 A1 | 10/2008 | Batchelor |
| 2008/0254878 A1 | 10/2008 | Saunders |
| 2008/0254881 A1 | 10/2008 | Lutnick |
| 2008/0254883 A1 | 10/2008 | Patel |
| 2008/0254891 A1 | 10/2008 | Saunders |
| 2008/0254892 A1 | 10/2008 | Saunders |
| 2008/0254897 A1 | 10/2008 | Saunders |
| 2008/0263173 A1 | 10/2008 | Weber |
| 2008/0300058 A1 | 12/2008 | Sum |
| 2008/0305864 A1 | 12/2008 | Kelly |
| 2008/0305865 A1 | 12/2008 | Kelly |
| 2008/0305866 A1 | 12/2008 | Kelly |
| 2008/0311994 A1 | 12/2008 | Amaitis |
| 2008/0318669 A1 | 12/2008 | Buchholz |
| 2008/0318686 A1 | 12/2008 | Crowder |
| 2009/0005165 A1 | 1/2009 | Arezina |
| 2009/0011822 A1 | 1/2009 | Englman |
| 2009/0017906 A1 | 1/2009 | Jackson |
| 2009/0021381 A1 | 1/2009 | Kondo |
| 2009/0029766 A1 | 1/2009 | Lutnick |
| 2009/0054149 A1 | 2/2009 | Brosnan |
| 2009/0061990 A1 | 3/2009 | Schwartz |
| 2009/0069063 A1 | 3/2009 | Thomas |
| 2009/0077396 A1 | 3/2009 | Tsai |
| 2009/0088258 A1 | 4/2009 | Saunders |
| 2009/0098925 A1 | 4/2009 | Gagner |
| 2009/0104977 A1 | 4/2009 | Zielinski |
| 2009/0104983 A1 | 4/2009 | Okada |
| 2009/0118002 A1 | 5/2009 | Lyons |
| 2009/0118013 A1 | 5/2009 | Finnimore |
| 2009/0118022 A1 | 5/2009 | Lyons |
| 2009/0124366 A1 | 5/2009 | Aoki |
| 2009/0124390 A1 | 5/2009 | Seelig |
| 2009/0131146 A1 | 5/2009 | Arezina |
| 2009/0131151 A1 | 5/2009 | Harris |
| 2009/0131155 A1 | 5/2009 | Hollibaugh |
| 2009/0132163 A1 | 5/2009 | Ashley, Jr. |
| 2009/0137255 A1 | 5/2009 | Ashley, Jr. |
| 2009/0138133 A1 | 5/2009 | Buchholz |
| 2009/0143141 A1 | 6/2009 | Wells |
| 2009/0149245 A1 | 6/2009 | Fabbri |
| 2009/0149261 A1 | 6/2009 | Chen |
| 2009/0153342 A1 | 6/2009 | Thorn |
| 2009/0156303 A1 | 6/2009 | Kiely |
| 2009/0163272 A1 | 6/2009 | Baker |
| 2009/0176578 A1 | 7/2009 | Herrmann |
| 2009/0191962 A1 | 7/2009 | Hardy |
| 2009/0197684 A1 | 8/2009 | Arezina |
| 2009/0216547 A1 | 8/2009 | Canora |
| 2009/0219901 A1 | 9/2009 | Bull |
| 2009/0221342 A1 | 9/2009 | Katz |
| 2009/0227302 A1 | 9/2009 | Abe |
| 2009/0239666 A1 | 9/2009 | Hall |
| 2009/0264190 A1 | 10/2009 | Davis |
| 2009/0270166 A1 | 10/2009 | Thukral |
| 2009/0270170 A1 | 10/2009 | Patton |
| 2009/0271287 A1 | 10/2009 | Halpern |
| 2009/0275402 A1 | 11/2009 | Backover |
| 2009/0275410 A1 | 11/2009 | Kisenwether |
| 2009/0275411 A1 | 11/2009 | Kisenwether |
| 2009/0280910 A1 | 11/2009 | Gagner |
| 2009/0282469 A1* | 11/2009 | Lynch ................. H04B 7/18506 370/328 |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0049738 A1 | 2/2010 | Mathur |
| 2010/0056248 A1 | 3/2010 | Acres |
| 2010/0062833 A1 | 3/2010 | Mattice |
| 2010/0062840 A1 | 3/2010 | Herrmann |
| 2010/0069160 A1 | 3/2010 | Barrett |
| 2010/0079237 A1 | 4/2010 | Falk |
| 2010/0081501 A1 | 4/2010 | Carpenter |
| 2010/0081509 A1 | 4/2010 | Burke |
| 2010/0099499 A1 | 4/2010 | Amaitis |
| 2010/0105454 A1 | 4/2010 | Weber |
| 2010/0106612 A1 | 4/2010 | Gupta |
| 2010/0115591 A1 | 5/2010 | Kane-Esrig |
| 2010/0120486 A1 | 5/2010 | Dewaal |
| 2010/0124967 A1 | 5/2010 | Lutnick |
| 2010/0130276 A1 | 5/2010 | Fiden |
| 2010/0160035 A1 | 6/2010 | Herrmann |
| 2010/0160043 A1 | 6/2010 | Fujimoto |
| 2010/0178977 A1 | 7/2010 | Kim |
| 2010/0184509 A1 | 7/2010 | Sylla |
| 2010/0197383 A1 | 8/2010 | Rader |
| 2010/0197385 A1 | 8/2010 | Aoki |
| 2010/0203955 A1 | 8/2010 | Sylla |
| 2010/0203957 A1 | 8/2010 | Enzminger |
| 2010/0203963 A1 | 8/2010 | Allen |
| 2010/0227662 A1 | 9/2010 | Speer, II |
| 2010/0227670 A1 | 9/2010 | Arezina |
| 2010/0227671 A1 | 9/2010 | Laaroussi |
| 2010/0227687 A1 | 9/2010 | Speer, II |
| 2010/0234091 A1 | 9/2010 | Baerlocher |
| 2010/0279764 A1 | 11/2010 | Allen |
| 2010/0323780 A1 | 12/2010 | Acres |
| 2010/0325703 A1 | 12/2010 | Etchegoyen |
| 2011/0009181 A1 | 1/2011 | Speer, II |
| 2011/0039615 A1 | 2/2011 | Acres |
| 2011/0053679 A1 | 3/2011 | Canterbury |
| 2011/0065492 A1 | 3/2011 | Acres |
| 2011/0076941 A1 | 3/2011 | Taveau |
| 2011/0086696 A1 | 4/2011 | Macewan |
| 2011/0105216 A1 | 5/2011 | Cohen |
| 2011/0111827 A1 | 5/2011 | Nicely |
| 2011/0111843 A1 | 5/2011 | Nicely |
| 2011/0111860 A1 | 5/2011 | Nguyen |
| 2011/0118010 A1 | 5/2011 | Brune |
| 2011/0143835 A1* | 6/2011 | Sizelove ................. G06F 1/1624 463/31 |
| 2011/0159966 A1 | 6/2011 | Gura |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay |
| 2011/0223993 A1 | 9/2011 | Allen |
| 2011/0244952 A1 | 10/2011 | Schueller |
| 2011/0247045 A1 | 10/2011 | Rajagopal |
| 2011/0263318 A1 | 10/2011 | Agarwal |
| 2011/0269548 A1 | 11/2011 | Barclay |
| 2011/0306400 A1 | 12/2011 | Nguyen |
| 2011/0306426 A1 | 12/2011 | Novak |

(56) References Cited

U.S. PATENT DOCUMENTS

| | | |
|---|---|---|
| 2012/0015709 A1 | 1/2012 | Bennett |
| 2012/0028703 A1 | 2/2012 | Anderson |
| 2012/0028718 A1 | 2/2012 | Barclay |
| 2012/0034968 A1 | 2/2012 | Watkins |
| 2012/0046110 A1 | 2/2012 | Amaitis |
| 2012/0083342 A1* | 4/2012 | Cross ............... F41J 3/0009 273/371 |
| 2012/0094769 A1 | 4/2012 | Nguyen |
| 2012/0100908 A1 | 4/2012 | Wells |
| 2012/0108319 A1 | 5/2012 | Caputo |
| 2012/0117209 A1* | 5/2012 | Sinha ............... G06F 21/88 709/221 |
| 2012/0122561 A1 | 5/2012 | Hedrick |
| 2012/0122567 A1 | 5/2012 | Gangadharan |
| 2012/0122584 A1 | 5/2012 | Nguyen |
| 2012/0122590 A1 | 5/2012 | Nguyen |
| 2012/0172130 A1 | 7/2012 | Acres |
| 2012/0173898 A1* | 7/2012 | Shih ............... G06F 1/26 713/310 |
| 2012/0184362 A1 | 7/2012 | Barclay |
| 2012/0184363 A1 | 7/2012 | Barclay |
| 2012/0185398 A1 | 7/2012 | Weis |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer, II |
| 2012/0239566 A1 | 9/2012 | Everett |
| 2012/0252411 A1 | 10/2012 | Johnsgard |
| 2012/0322563 A1 | 12/2012 | Nguyen |
| 2012/0330740 A1 | 12/2012 | Pennington |
| 2013/0005433 A1 | 1/2013 | Holch |
| 2013/0005443 A1 | 1/2013 | Kosta |
| 2013/0005453 A1 | 1/2013 | Nguyen |
| 2013/0059650 A1 | 3/2013 | Sylla |
| 2013/0065668 A1 | 3/2013 | Lemay |
| 2013/0103965 A1 | 4/2013 | Golembeski, Jr. |
| 2013/0104193 A1 | 4/2013 | Gatto |
| 2013/0130766 A1 | 5/2013 | Harris |
| 2013/0132745 A1 | 5/2013 | Schoening |
| 2013/0165210 A1 | 6/2013 | Nelson |
| 2013/0185559 A1 | 7/2013 | Morel |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams |
| 2013/0252730 A1 | 9/2013 | Joshi |
| 2013/0275376 A1 | 10/2013 | Hudlow |
| 2013/0281187 A1 | 10/2013 | Skelton |
| 2013/0281188 A1 | 10/2013 | Guinn |
| 2013/0316808 A1 | 11/2013 | Nelson |
| 2013/0337878 A1 | 12/2013 | Shepherd |
| 2013/0337889 A1 | 12/2013 | Gagner |
| 2014/0006129 A1 | 1/2014 | Heath |
| 2014/0057716 A1 | 2/2014 | Massing |
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274306 A1 | 9/2014 | Crawford, III |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter, Sr. |
| 2015/0143543 A1 | 5/2015 | Phegade |
| 2016/0125695 A1 | 5/2016 | Nguyen |
| 2017/0116819 A1 | 4/2017 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0337770 A1 | 11/2017 | Nguyen |
| 2018/0144581 A1 | 5/2018 | Nguyen |
| 2019/0005773 A1 | 1/2019 | Nguyen |
| 2019/0122490 A1 | 4/2019 | Nguyen |
| 2019/0122492 A1 | 4/2019 | Nguyen |
| 2019/0213829 A1 | 7/2019 | Nguyen |
| 2020/0372753 A1 | 11/2020 | Nguyen |

FOREIGN PATENT DOCUMENTS

| | | |
|---|---|---|
| GB | 2096376 A | 10/1982 |
| GB | 2097570 A | 11/1982 |
| GB | 2335524 A | 9/1999 |
| JP | 12005000454 | 5/2007 |
| WO | 2005073933 | 8/2005 |
| WO | 2008027621 | 3/2008 |
| WO | 2009026309 | 2/2009 |
| WO | 2009062148 | 5/2009 |
| WO | 2010017252 | 2/2010 |

OTHER PUBLICATIONS

Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Office Action for U.S. Appl. No. 13/801,171, dated Jun. 6, 2016.
Final Office Action for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Advisory Action for U.S. Appl. No. 13/296,182, dated May 8, 2014.
Notice of Allowance for U.S. Appl. No. 13/843,192, dated Aug. 10, 2016.
Notice of Allowance for U.S. Appl. No. 15/480,295, dated Jun. 15, 2020.
Office Action for U.S. Appl. No. 16/559,553, dated Sep. 11, 2020.
Office Action for U.S. Appl. No. 16/794,212, dated Sep. 11, 2020.

(56) References Cited

OTHER PUBLICATIONS

Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
"Professional Casino Slot Machine", Posted at www.vbtutor.net/VB. Sample/vbslot2.htm on Oct. 20, 2009.
Final Office Action for U.S. Appl. No. 16/794,212, dated Feb. 17, 2021.
Office Action for U.S. Appl. No. 16/351,416, dated Feb. 23, 2021.
Office Action for U.S. Appl. No. 15/674,480, dated Mar. 25, 2021.
Final Office Action for U.S. Appl. No. 16/219,940, dated Mar. 26, 2021.
Office Action for U.S. Appl. No. 16/183,632, dated May 4, 2021.
Office Action (Non-Final Rejection) dated Jun. 22, 2022 for U.S. Appl. No. 17/321,502 (pp. 1-7).
Office Action (Notice of Allowance and Fees Due (PTOL-85)) dated Oct. 5, 2022 for U.S. Appl. No. 17/321,502 (pp. 1-8).
Benston, Liz, "Harrahs Launches iPhone App; Caesars Bypasses Check-in," Las Vegas Sun, Las Vegas, NV. Jan. 8, 2010.
Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Final Office Action for U.S. Appl. No. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action fpr U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/632,828, mailed Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Office Action for U.S. Appl. No. 13/801,271, dated Oct. 31, 2014.
Office Action for U.S. Appl. No. 13/833,116, dated Mar. 27, 2015.
Office Action for U.S. Appl. No. 13/843,192, dated Jun. 19, 2015.
Final Office Action for U.S. Appl. No. 13/833,116, dated Sep. 24, 2015.
Office Action for U.S. Appl. No. 13/622,702, dated Mar. 22, 2016.
Final Office Action for U.S. Appl. No. 14/017,159, dated Jun. 6, 2016.
Office Action for U.S. Appl. No. 13/843,192, dated Jun. 9, 2016.
Restriction Requirement for U.S. Appl. No. 13/296,182, dated Oct. 12, 2012.
Advisory Action for U.S. Appl. No. 13/843,192, dated May 8, 2014.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Nov. 14, 2016.
Notice of Allowance for U.S. Appl. No. 13/833,116, dated Oct. 11, 2016.
Notice of Allowance for U.S. Appl. No. 13/801,271, dated Dec. 2, 2016.

(56) References Cited

OTHER PUBLICATIONS

Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Non-Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final Office Action for U.S. Appl. No. 13/801,256, dated Aug. 15, 2014.
Final Office Action for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
U.S. Appl. No. 12/945,888, filed Nov. 14, 2010.
U.S. Appl. No. 12/945,889, filed Nov. 14, 2010.
U.S. Appl. No. 13/800,917, filed Mar. 13, 2013.
U.S. Appl. No. 13/961,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2013.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.

(56) References Cited

OTHER PUBLICATIONS

Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717, dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 13/801,171, dated Oct. 31, 2018.
Final Office Action for U.S. Appl. No. 15/835,448, dated Nov. 2, 2018.
Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
U.S. Appl. No. 13/622,702, filed Sep. 19, 2012.
Advisory Action for U.S. Appl. No. 13/632,828, mailed Feb. 25, 2016.
Notice of Allowance for U.S. Appl. No. 13/843,192, mailed Aug. 10, 2016.
Office Action for U.S. Appl. No. 16/219,940, dated Jul. 22, 2020.
Office Action for U.S. Appl. No. 16/449,717, dated Nov. 9, 2020.
Final Office Action for U.S. Appl. No. 13/622,702, dated Nov. 30, 2020.
Final Office Action for U.S. Appl. No. 15/674,480, dated Dec. 7, 2020.
Office Action for U.S. Appl. No. 16/168,813, dated Dec. 8, 2020.
Office Action for U.S. Appl. No. 16/600,395, dated Dec. 22, 2020.
Final Office Action for U.S. Appl. No. 16/559,553, dated Jan. 21, 2021.
Final Office Action for U.S. Appl. No. 16/449,717, dated Jan. 29, 2021.
Notice of Allowance for U.S. Appl. No. 15/811,654, dated Feb. 3, 2021.
Notice of Allowance for U.S. Appl. No. 14/017,150, dated Feb. 5, 2021.

\* cited by examiner

METHOD AND SYSTEM FOR AUTHENTICATING MOBILE SERVERS FOR PLAY OF GAMES OF CHANCE

RELATED APPLICATION(S)

The present application is a continuation of U.S. patent application Ser. No. 17/321,502, filed on May 17, 2021 and entitled, "METHOD AND SYSTEM FOR AUTHENTICATING MOBILE SERVERS FOR PLAY OF GAMES OF CHANCE," which is hereby incorporated herein by reference, which is in turn a continuation of U.S. patent application Ser. No. 15/811,654, filed on Nov. 13, 2017 and entitled "AUTHENTICATION OF MOBILE SERVERS," which is hereby incorporated herein by reference, and which in turn is a continuation of U.S. patent application Ser. No. 14/217,066, filed on Mar. 17, 2014 and entitled "AUTHENTICATION OF MOBILE SERVERS," which is hereby incorporated herein by reference, and which in turn claims priority benefit of U.S. Provisional Patent Application No. 61/794,913, filed Mar. 15, 2013, and entitled "AUTHENTICATION OF MOBILE SERVERS", which is hereby incorporated by reference herein.

This application is related to U.S. patent application Ser. No. 13/833,116, filed Mar. 15, 2013, entitled "PORTABLE INTERMEDIARY TRUSTED DEVICE", which is hereby incorporated by reference herein in its entirety for all purposes.

BACKGROUND

Many people are playing games of chance on mobile gaming establishments, such as cruise ships, airplanes, river boats, and the like. The mobile gaming establishments may have servers configured to allow its customers to play the games of chance. However, because the mobile gaming establishments are not always stationary, it is difficult to authenticate the servers to ensure the servers have not been hacked, breached, or otherwise manipulated.

SUMMARY

There is disclosed a system for authenticating mobile servers comprising at least one mobile server configured to support games of chance and an authentication server configured to: assign an authentication identifier to each of the at least one mobile server and at least one backup mobile server; pre-authenticate the at least one backup mobile server; and authenticate the at least one mobile server for at least one of a predetermined period of time or a predetermined geographical area.

An example embodiment describes a method for authenticating mobile servers to support games of chance comprising: assigning authentication identifiers to at least one mobile server and at least one backup mobile server; pre-authenticating the at least one backup mobile server; authenticating the at least one mobile server for at least one of a predetermined period of time or a predetermined geographical area; and tracking activities of the at least one mobile server.

Another example embodiment describes a non-transitory computer readable medium for authenticating mobile servers comprising a memory configured to store a plurality of instructions and a processor configured to, when the instructions are executed, perform the steps of: assigning an authentication identifier to at least one mobile server and at least one backup mobile server; pre-authenticating the at least one backup mobile server; authenticating the at least one mobile server for at least one of a predetermined period of time or a predetermined geographical area; and verifying at least one of a location or the authentication identifier of the at least one mobile server after the predetermined period of time or after an operating lease expires.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

DETAILED DESCRIPTION

Embodiments are described herein in the context of authentication of a mobile server. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
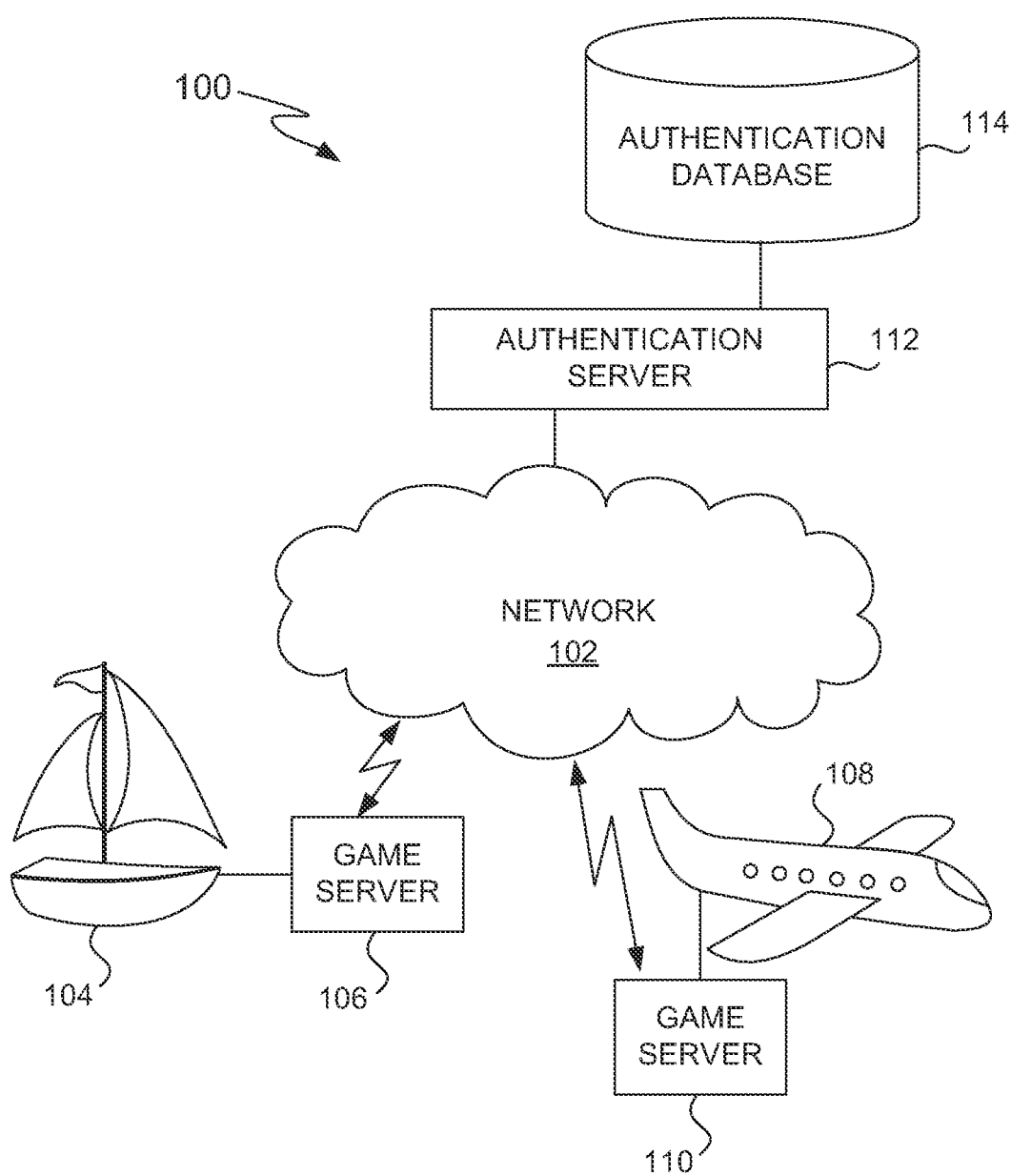
FIG. 1 illustrates an example gaming system.

FIG. 1 illustrates an example gaming system. The gaming system 100 may have a plurality of mobile gaming establishments. The mobile gaming establishments may be any movable device such as a cruise ship 104, airplane 108, bus, train, car, river boat, and the like. Each mobile gaming establishment may have at least one mobile server such as a mobile gaming server, a mobile financial server, a mobile identification (ID) server, and the like. As illustrated, cruise ship 104 may have mobile server 106, and airplane 108 may have mobile server 110.

Mobile server 106, 110 may be gaming servers configured to store and execute gaming data to allow customers to play games (e.g. games of chance, video games, and the like). Gaming server 106, 110 may also be configured to store and execute other features as desired by the gaming establishment. For example, mobile gaming server may be configured to execute games of chance on a plurality of mobile gaming devices. The plurality of mobile gaming devices may be any portable device capable of playing games (e.g. games of chance, video games, and the like) such as, for example, portable telephones, laptops, computers, notebooks, tablets, media players, netbooks, and the like.

The gaming servers 106, 110 may be configured to communicate with an authentication server 112 via network 102. The gaming servers 106, 110 may communicate with authentication server 112 via any wireless connection. Wireless connections may be any known wireless methods such as a 3G wireless technology, 4G wireless technology, Bluetooth, wireless universal serial bus, WiMax, IEEE 802.11x, LTE, 802.16 technology, radio frequency, narrow-beam infrared (IR) sensor, WiFi, point-to-point microwave communication, or any other known wireless methods. Additionally, gaming servers 106, 110 may also communicate with the authentication server 112 via satellite. In this embodiment, the authentication server 112 is land-based and fixed to a regional, territorial, and/or terrestrial location. In another embodiment, the authentication server 112 is housed in the same mobile vessel as the gaming servers 106, 110.

Authentication server 112 may be controlled by any third party required to authenticate gaming servers. For example, the third party may be any governmental control board such as a gaming control board. In another example, the third party may be any non-government company or agency authorized to authenticate gaming servers.

Authentication server 112 may be configured to determine the location of the mobile servers 106, 110. Any location methods may be used to locate the mobile servers 106, 110 such as the use of global positioning satellites, cellular triangulations/trilaterations, or any other known methods. Based on the location of the mobile servers 106, 110, authentication server 112 may determine the most efficient method to communicate with mobile servers 106, 110. For example, if authentication server 112 determines that the mobile server 106, 110 is in international waters and/or a location too far from authentication server 112, authentication server 112 may use satellites or WiMax, whichever is closest to the mobile vessel's current location, to communicate with the mobile servers 106, 110. In another example, if authentication server 112 determines that the mobile server 106, 110 is local (e.g. in a parked bus, on a ship docked at port, on an airplane landed and/or taxied at an airport, and the like) and/or not located far from authentication server 112, authentication server 112 may use a secured wired or WiFi wireless connections to communicate with the mobile servers 106, 110.

Authentication server 112 may have an authentication database 114. The authentication database 114 may be configured to store server information such as digital certificates, digital signatures of software, player ID database, unalterable server identification (e.g., hardware based ID), and any other identifier information for each mobile game server, such as mobile game server 106, 110. Mobile servers 106, 110 may be periodically authenticated to ensure the servers are not hacked, breached, or otherwise manipulated. Mobile servers 106, 110 may be authenticated every 5-30 seconds, minute, hour, day, or at any other desired time interval that may also be pre-defined by an operating lease. An operating lease is a contract to allow the mobile servers 106, 110 to operate. Once authenticated, the mobile servers 106,110 maybe granted a license to operate (the operating lease) over a period of time (e.g., 24 hours), or over a territorial and/or regional location (e.g., on international waters), or a combination of both. Once expired, the mobile servers 106, 110 need to be authenticated again before the operating lease is renewed. The operating lease may simply be a digital certificate residing on the mobile servers 106, 110 that is digitally signed (e.g., using public-private key cryptographic technology) by a trusted entity such as a gaming control board, a manufacturer of the mobile server, a certifying test agency, and the like. The digital certificate binds the ID of the mobile server with a new expiration date, and may conform to the ITU-T standard X.509, which specifies a certificate format that is known in the art.

Authentication server 112 may request authentication information from the mobile server 106, 110. Any known authentication method may be used to authenticate mobile server 106, 110. For example, authentication server 112 may request a digital certificate from the mobile server 106, 110. The received digital certificate may be compared to the digital certificate stored in the authentication database 114. In another example, authentication server 112 may request the digital signature for a software module or even the digital signature for the entire mass storage device. The software module maybe processed through any hashing algorithm known in the art and the result is compared to the decrypted hash from the digital signature. In yet another example, authentication server 112 may request a unique identifier, which may be stored in unalterable read-only memory (ROM) from the mobile server 106, 110. The received unique identifier may be compared to the unique identifier stored in the authentication database 114. In still another embodiment, authentication server 112 may take a digital fingerprint of the image of the hard drive of the mobile server 106, 110. The image may be taken before the cruise ship 104 leaves port, the airplane 108 takes off from the airport, or before the mobile gaming establishment begins its journey. The image signature may then be compared to the image signature stored in the authentication database 114.

If the mobile gaming server 106, 110 is not authenticated or is otherwise determined to have been hacked, breached or manipulated, the mobile gaming device 106, 110 may be disabled or shut down. In one embodiment, the data on the mobile gaming server 106, 110 may be deleted and all data re-downloaded. In another embodiment, the gaming establishment may have another server (e.g. a back-up server that is pre-authenticated) to use while the original mobile server is being serviced or otherwise disabled.

Figure 2A:
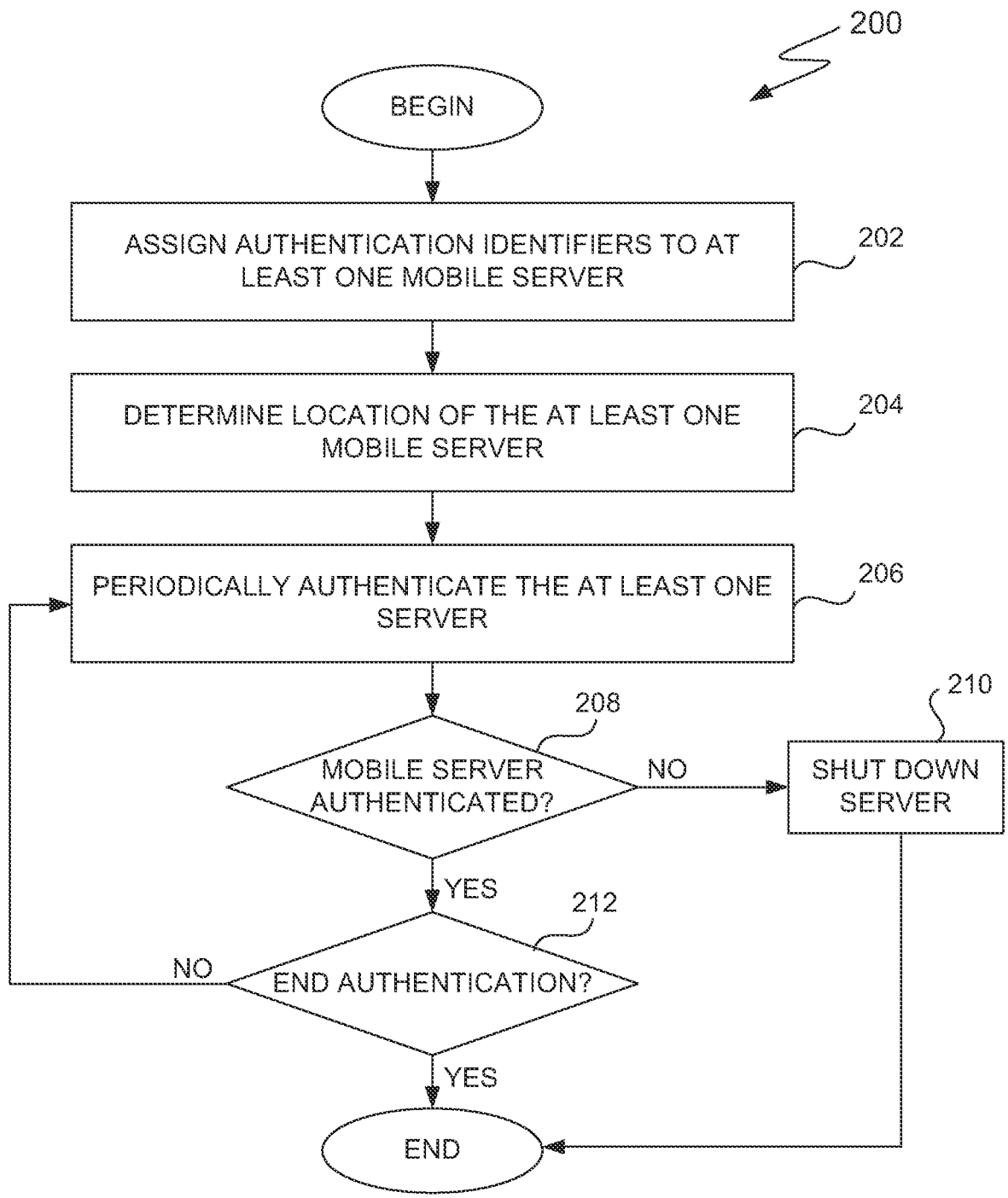
FIGS. 2A and 2B illustrate an example method for authenticating a mobile server.
Figure 2B:
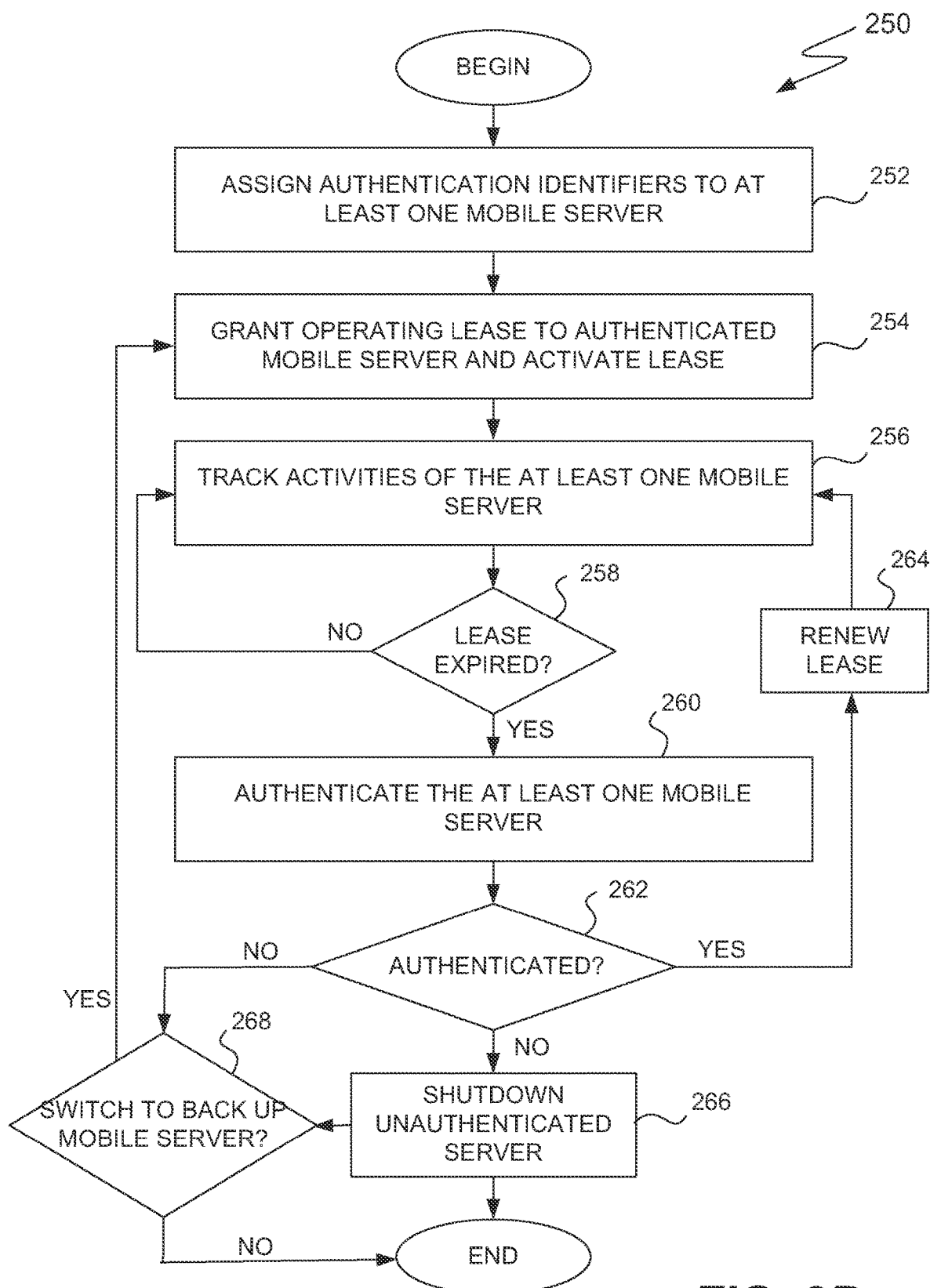

FIGS. 2A and 2B illustrate an example method for authenticating a mobile server. The method 200 may begin with assigning authentication identifiers to at least one mobile server at 202. The authentication identifiers may be any identifier that is able to authenticate the mobile server using any known authentication method. For example, the authentication identifier may be a digital certificate, operating software's digital signatures, unalterable unique identifier stored in read-only memory (ROM), the unalterable ID of a portable intermediary trusted device attached to the mobile server 106, 110, an image of the hard drive of the mobile server (the image taken before the mobile gaming establishment begins its journey), and the like. The portable intermediary trusted device may be, for example, the portable intermediary trusted device described in related U.S. patent application Ser. No. 13/833,116, filed Mar. 15, 2013, entitled "PORTABLE INTERMEDIARY TRUSTED DEVICE," which is hereby incorporated by reference herein in its entirety for all purposes. The authentication identifiers may be stored in a database, such as authentication database 114 illustrated in FIG. 1.

The location of the at least one mobile server may be determined at 204. The location may be determined by any authentication server, such as authentication server 112 illustrated in FIG. 1. Any known location methods may be used to locate the mobile server such as the use of global positioning satellites, cellular triangulations or trilaterations, Wifi triangulation, RF fingerprint, or any other known methods.

The at least one mobile servers may be periodically authenticated at 206. The location of the mobile servers may determine how the authentication server communicates with the mobile servers. For example, if authentication server determines that the mobile server is in international waters and/or a location too far from authentication server, authentication server 112 may use satellites to communicate with the mobile servers. In another example, the authentication server 112 may determine that the mobile server is 15 miles away from the nearest WiMax wireless station, a distance that is well within the WiMax station's range. Authentication server 112 may choose to use that WiMax station. In yet another example, if authentication server determines that the mobile server is local (e.g. in a parked bus, a ship docked at port, an airplane landed and/or taxied at an airport, and the like) and/or not located far from authentication server, authentication server may use wireless connections to communicate with the mobile servers.

Mobile servers may be periodically authenticated to ensure the servers are not hacked, breached, or otherwise manipulated. Mobile servers may be authenticated every 5-30 seconds, minute, hour, day, or at any other desired time interval.

If the at least one mobile server is authenticated at 208, a determination of whether to end the authentication is made at 212. Authentication of the mobile servers may end based on any criteria. For example, if the cruise ship is docked at its final destination and the game servers are no longer in use, the authentication may end at 212. In another example, if the airplane has landed at its final destination, the authentication may end at 212.

If the mobile server is not authenticated at 208, the mobile server may be shut down or otherwise disabled at 210. For example, if the digital signature for a software module received from the mobile server does not match the digital signature stored in the authentication server, the mobile server may be disabled at 210.

FIG. 2B is another embodiment of the authentication process. The method 250 begins with assigning the authentication identifiers at 252, to one or more mobile servers. After that, a trusted software image of the operating applications may be loaded onto the mobile server. At 254, an operating lease may be granted to the authenticated mobile server, and subsequently activated. An operating lease is a contract to allow the mobile servers to operate. Once authenticated, the mobile servers 106,110 may be granted a license to operate (the operating lease) over a period of time (e.g., 24 hours), or over a territorial and/or regional location (e.g., on international waters), or a combination of both. Once expired, the mobile servers 106, 110 may need to be authenticated again before the operating lease is renewed. The operating lease may simply be a digital certificate residing on the mobile servers 106, 110 that is digitally signed (e.g., using public-private key cryptographic technology) by a trusted entity such as a gaming control board, a manufacturer of the mobile server, a certifying test agency, and the like. The digital certificate binds the ID of the mobile server with a new expiration date, and may conform to the ITU-T standard X.509, which specifies a certificate format that is known in the art.

Once activated, the mobile server's activities can be tracked at 256. Operating parameters such as the location of the servers, up time, transactions conducted, and the like will be recorded in a database. At 258, the operating lease term may be verified to determine whether the lease has expired. For example, if the time elapsed since activation has exceeded the contracted duration allowed in the lease, or the location of the mobile server is outside the allowed territory, region, terrestrial, and/or geo-fence, or both, then the lease is deemed expired, and an authentication is initiated at 260. If not, the authentication server can return to tracking the activities of the at least one mobile server at 256.

If it is determined, at 260, that an authentication operation is required, the authentication server may verify the authenticity of the mobile server at 262. If it is determined, at 262, that the mobile server is authentic and that trusted applications have not been altered, the operating lease may be renewed at step 264, and the method returns to step 256. If it is determined, at 262, that the authentication process failed, a determination of whether to switch to a back-up mobile server may be made at 268. If a switch to a back-up mobile server is made at 268, the method may return to step 254. The determination of whether to switch to a back-up mobile server may be based on various criteria such as whether there are any previously authenticated back-up servers, whether the back-up servers have valid operating lease, and the like.

If it is determined to not switch to back-up server at 268, the authentication server may shut down the failed mobile server at 266 and the method 250 may end. To maintain the continuity of the operation, a back-up mobile server, that was previously authenticated, may be brought online at 268, and a new lease may be granted and activated for the back-up mobile server. The failed mobile server may be quarantined, or reformatted, or re-imaged, and a new back-up mobile server is created either from yet another back-up server or the reformatted failed server.

Figure 3:
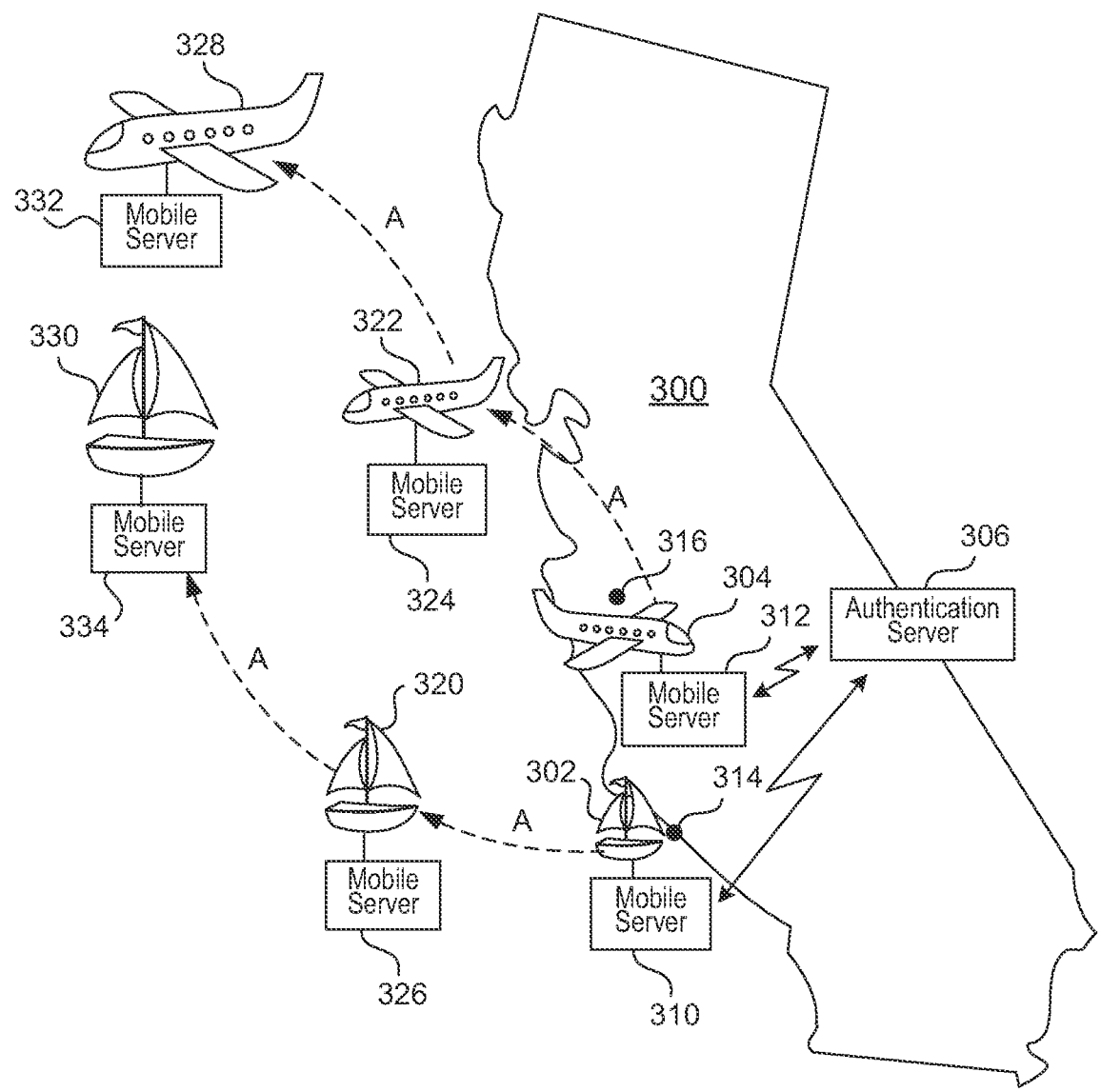
FIG. 3 illustrates an example authentication of a mobile server.

FIG. 3 illustrates an example authentication of a mobile server. Initially, when the mobile establishment, such as cruise ship 304 or airplane 302, is stationary before beginning its journey, authentication identifiers for each of the mobile servers 310, 312 may be obtained by authentication server 306. Authentication identifiers may be, for example, a digital certificate, the operating software's digital signatures, unalterable unique identifier stored in read-only memory (ROM), the unalterable ID of a portable intermediary trusted device attached to the mobile server 310, 312, a unique identifier, an image of the hard drive of the mobile server, and the like. The portable intermediary trusted device may be, for example, the portable intermediary trusted device described in related U.S. patent application Ser. No. 13/833,116, filed Mar. 15, 2013, entitled "PORTABLE INTERMEDIARY TRUSTED DEVICE," which is hereby incorporated by reference herein in its entirety for all purposes. The authentication identifiers may be any identifier that is able to authenticate the mobile server 310, 312 using any known authentication method. The authentication identifiers may be stored in a database, such as authentication database 114 illustrated in FIG. 1.

The location of the mobile servers 310, 312 may be determined by the authentication server 306. Determination of the location may indicate whether the mobile gaming establishment 302, 304 has left its beginning destination 314, 316 or is still at the starting destination 314, 316. If the mobile gaming establishment 322, 3320 has left its starting destination 314, 316 along route "A", a determination of the location mobile server 310, 312 may be used to determine how to communicate with the mobile server 310, 312. For example, if the location of the mobile servers 324, 326 is located close to land 300 and/or the authentication server 306, authentication server 306 may communicate with the mobile servers 324, 326 via wireless methods. Wireless connections may be any known wireless methods such as a 3G wireless technology, 4G wireless technology, Bluetooth, wireless universal serial bus, WiMax, IEEE 802.11x, LTE, or 802.16 technology, radio frequency, narrow-beam infrared (IR) sensor, point-to-point microwave communication, WiFi, or any other known wireless methods. In one embodiment, the authentication server 306 may be land-based and fixed to a regional, territorial, and/or terrestrial location. In another embodiment, the authentication server 306 may be housed in the same mobile vessel as the gaming servers 310, 312.

However, as mobile establishments 328, 330 are proceeding along route "A" and become further away from the land 300 and/or authentication server 306, authentication sever 306 may need to communicate with mobile servers 332, 334 using known long distance WiMax or satellite methods.

Once mobile gaming establishments 302, 304 leave their starting destination 314, 316, the mobile servers 324, 326, 332, 334 may be periodically authenticated by the authentication server 306. Mobile servers 324, 326, 332, 334 may be periodically authenticated to ensure the servers are not hacked, breached, or otherwise manipulated. Mobile servers 324, 326, 332, 334 may be authenticated every 5-30 seconds, minute, hour, day, or at any other desired time interval and/or time interval allowed by the operating lease.

If the mobile server 324, 326, 332, 334 is authenticated, no action is taken. However, if the mobile server 324, 326, 332, 334 is not authenticated, the mobile server 324, 326, 332, 334 may be shut down or otherwise disabled and a backup mobile server, that was previously authenticated, maybe brought up as a substitution for the failed mobile server. For example, if the digital signature for a software module received from the mobile server 324, 326, 332, 334 does not match the digital signature of the corresponding trusted software stored in the authentication server 306, the mobile server 324, 326, 332, 334 may be disabled.

Figure 4:
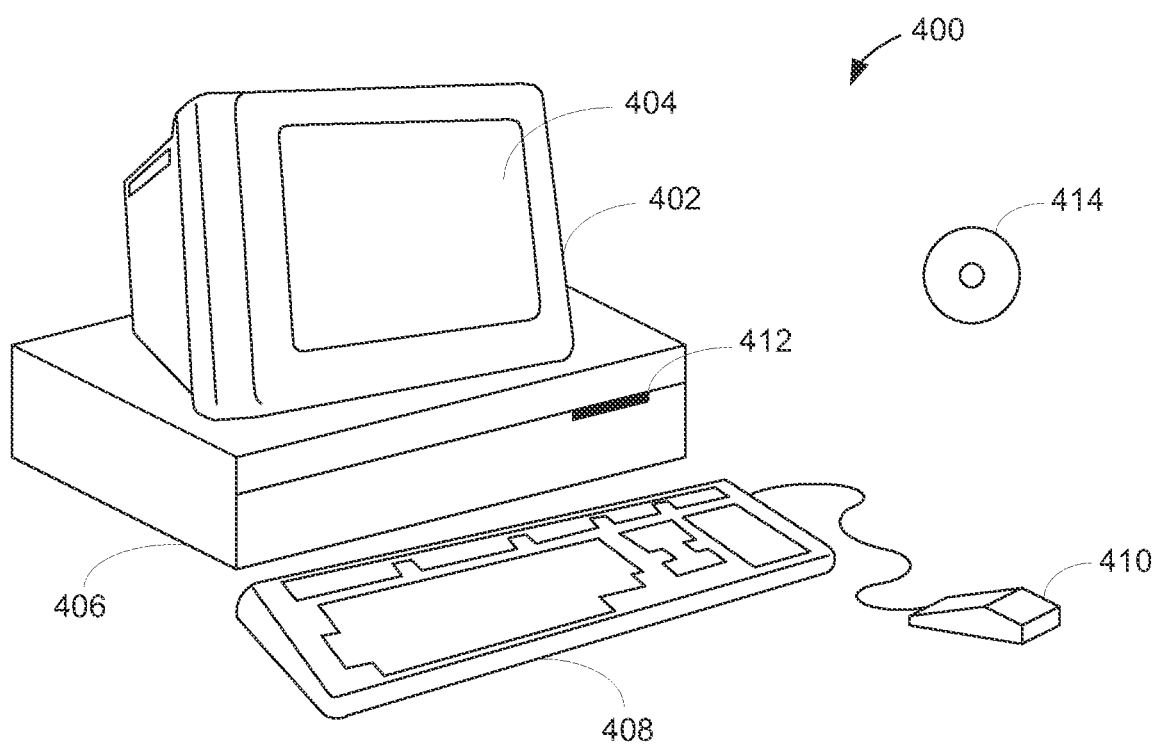
FIG. 4 illustrates an exemplary computer system.

FIG. 4 illustrates an exemplary computer system 400 suitable for use with at least one embodiment of the invention. The methods, processes and/or graphical user interfaces discussed above can be provided by a computer system. The computer system 400 includes a display monitor 402 having a single or multi-screen display 404 (or multiple displays), a cabinet 406, a keyboard 408, and a mouse 410. The mouse 410 is representative of one type of pointing device. The cabinet 406 houses a processing unit (or processor), system memory and a hard drive (not shown). The cabinet 406 also houses a drive 412, such as a DVD, CD-ROM or floppy drive. The drive 412 can also be a removable hard drive, a Flash or EEPROM device, etc. Regardless, the drive 412 may be utilized to store and retrieve software programs incorporating computer code that implements some or all aspects of the invention, data for use with the invention, and the like. Although CD-ROM 414 is shown as an exemplary computer readable storage medium, other computer readable storage media including floppy disk, tape, Flash or EEPROM memory, memory card, system memory, and hard drive may be utilized. In one implementation, a software program for the computer system 400 is provided in the system memory, the hard drive, the drive 412, the CD-ROM 414 or other computer readable storage medium and serves to incorporate the computer code that implements some or all aspects of the invention.

Figure 5:
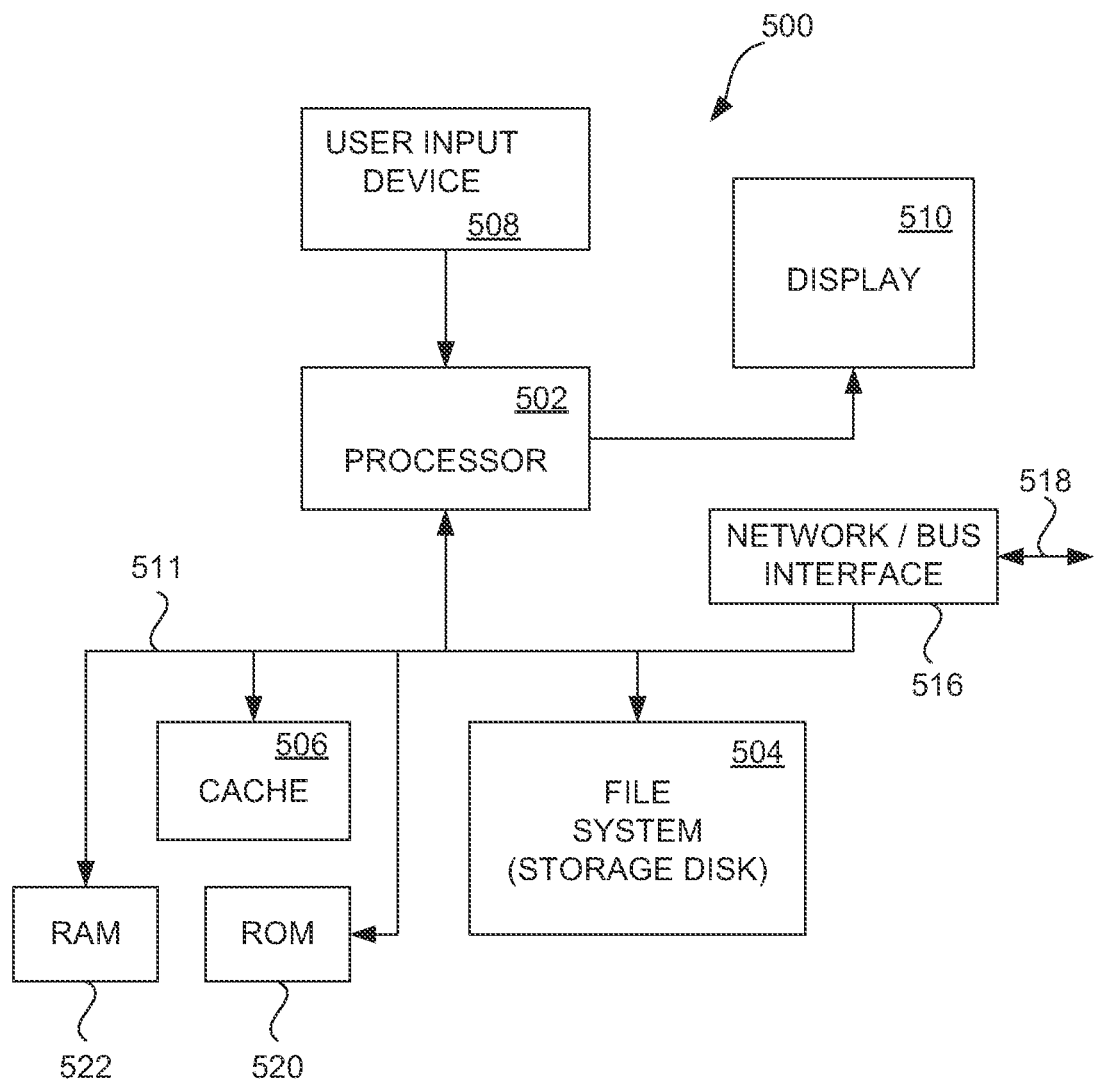
FIG. 5 is a block diagram of an example computing system.

FIG. 5 is a block diagram of an example computing system. The computing system 500 may be the gaming server 106, 110, authentication server 112 illustrated in FIG. 1, or any other server or computing device used to carry out the various embodiments disclosed herein. The computing system 500 may include a processor 502 that pertains to a microprocessor or controller for controlling the overall operation of the computing system 500. The computing system 500 may store any type of data and information as discussed above in a file system 504 and a cache 506. The file system 504 is, typically, a storage disk or a plurality of disks. The file system 504 typically provides high capacity storage capability for the computing system 500. However, since the access time to the file system 504 is relatively slow, the computing system 500 can also include a cache 506. The cache 506 is, for example, Random-Access Memory (RAM) provided by semiconductor memory. The relative access time to the cache 506 is substantially shorter than for the file system 504. However, the cache 506 does not have the large storage capacity of the file system 504. Further, the file system 504, when active, consumes more power than does the cache 506. The computing system 500 also includes a RAM 520 and a Read-Only Memory (ROM) 522. The ROM 522 can store programs, utilities or processes to be executed in a non-volatile manner. The RAM 520 provides volatile data storage, such as for the cache 506.

The computing system 500 also includes a user input device 508 that allows a user of the computing system 500 to interact with the computing system 500. For example, the user input device 508 can take a variety of forms, such as a button, keypad, dial, and the like. Still further, the computing system 500 includes a display 510 (screen display) that can be controlled by the processor 502 to display information, such as a list of upcoming appointments, to the user. A data bus 511 can facilitate data transfer between at least the file system 504, the cache 506, the processor 502, and the CODEC 512.

In one embodiment, the computing system 500 serves to store a plurality of authentication information, mobile server data, and the like in the file system 504. When a user desires to have the computing system display a particular advertisement, a list of the various third party advertisers may be displayed on the display 510.

The computing system 500 may also include a network/bus interface 516 that couples to a data link 518. The data link 518 allows the computing system 500 to couple to a host computer or data network, such as the Internet. The data link 518 can be provided over a wired connection or a wireless connection. In the case of a wireless connection, the network/bus interface 516 can include a wireless transceiver.

While embodiments and applications of this invention have been shown and described, it would be apparent to those skilled in the art having the benefit of this disclosure that many more modifications than mentioned above are possible without departing from the inventive concepts herein. For example, the authentication server maybe regional, territorial, and/or terrestrial (e.g., fixed WiMax towers along the ocean shore, tracking the location of a cruise ship), or the authentication server maybe mobile alongside the mobile server as well (e.g., authentication server is onboard the cruise ship).

Embodiments are described herein in the context of authentication of a mobile server. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

FIG. 1 illustrates an example gaming system. The gaming system 100 may have a plurality of mobile gaming establishments. The mobile gaming establishments may be any movable device such as a cruise ship 104, airplane 108, bus, train, car, river boat, and the like. Each mobile gaming establishment may have at least one mobile server such as a mobile gaming server, a mobile financial server, a mobile identification (ID) server, and the like. As illustrated, cruise ship 104 may have mobile server 106, and airplane 108 may have mobile server 110.

Mobile server 106, 110 may be gaming servers configured to store and execute gaming data to allow customers to play games (e.g. games of chance, video games, and the like). Gaming server 106, 110 may also be configured to store and execute other features as desired by the gaming establishment. For example, mobile gaming server may be configured to execute games of chance on a plurality of mobile gaming devices. The plurality of mobile gaming devices may be any portable device capable of playing games (e.g. games of chance, video games, and the like) such as, for example, portable telephones, laptops, computers, notebooks, tablets, media players, netbooks, and the like.

The gaming servers 106, 110 may be configured to communicate with an authentication server 112 via network 102. The gaming servers 106, 110 may communicate with authentication server 112 via any wireless connection. Wireless connections may be any known wireless methods such as a 3G wireless technology, 4G wireless technology, Bluetooth, wireless universal serial bus, WiMax, IEEE 802.11x, LTE, 802.16 technology, radio frequency, narrow-beam infrared (IR) sensor, WiFi, point-to-point microwave communication, or any other known wireless methods. Additionally, gaming servers 106, 110 may also communicate with the authentication server 112 via satellite. In this embodiment, the authentication server 112 is land-based and fixed to a regional, territorial, and/or terrestrial location. In another embodiment, the authentication server 112 is housed in the same mobile vessel as the gaming servers 106, 110.

Authentication server 112 may be controlled by any third party required to authenticate gaming servers. For example, the third party may be any governmental control board such as a gaming control board. In another example, the third party may be any non-government company or agency authorized to authenticate gaming servers.

Authentication server 112 may be configured to determine the location of the mobile servers 106, 110. Any location methods may be used to locate the mobile servers 106, 110 such as the use of global positioning satellites, cellular triangulations/trilaterations, or any other known methods. Based on the location of the mobile servers 106, 110, authentication server 112 may determine the most efficient method to communicate with mobile servers 106, 110. For example, if authentication server 112 determines that the mobile server 106, 110 is in international waters and/or a location too far from authentication server 112, authentication server 112 may use satellites or WiMax, whichever is closest to the mobile vessel's current location, to communicate with the mobile servers 106, 110. In another example, if authentication server 112 determines that the mobile server 106, 110 is local (e.g. in a parked bus, on a ship docked at port, on an airplane landed and/or taxied at an airport, and the like) and/or not located far from authentication server 112, authentication server 112 may use a secured wired or WiFi wireless connections to communicate with the mobile servers 106, 110.

Authentication server 112 may have an authentication database 114. The authentication database 114 may be configured to store server information such as digital certificates, digital signatures of software, player ID database, unalterable server identification (e.g., hardware based ID), and any other identifier information for each mobile game server, such as mobile game server 106, 110. Mobile servers 106, 110 may be periodically authenticated to ensure the servers are not hacked, breached, or otherwise manipulated. Mobile servers 106, 110 may be authenticated every 5-30 seconds, minute, hour, day, or at any other desired time interval that may also be pre-defined by an operating lease. An operating lease is a contract to allow the mobile servers 106, 110 to operate. Once authenticated, the mobile servers 106,110 maybe granted a license to operate (the operating lease) over a period of time (e.g., 24 hours), or over a territorial and/or regional location (e.g., on international waters), or a combination of both. Once expired, the mobile servers 106, 110 need to be authenticated again before the operating lease is renewed. The operating lease may simply be a digital certificate residing on the mobile servers 106, 110 that is digitally signed (e.g., using public-private key cryptographic technology) by a trusted entity such as a gaming control board, a manufacturer of the mobile server, a certifying test agency, and the like. The digital certificate binds the ID of the mobile server with a new expiration date, and may conform to the ITU-T standard X.509, which specifies a certificate format that is known in the art.

Authentication server 112 may request authentication information from the mobile server 106, 110. Any known authentication method may be used to authenticate mobile server 106, 110. For example, authentication server 112 may request a digital certificate from the mobile server 106, 110. The received digital certificate may be compared to the digital certificate stored in the authentication database 114. In another example, authentication server 112 may request the digital signature for a software module or even the digital signature for the entire mass storage device. The software module maybe processed through any hashing algorithm known in the art and the result is compared to the decrypted hash from the digital signature. In yet another example, authentication server 112 may request a unique identifier, which may be stored in unalterable read-only memory (ROM) from the mobile server 106, 110. The received unique identifier may be compared to the unique identifier stored in the authentication database 114. In still another embodiment, authentication server 112 may take a digital fingerprint of the image of the hard drive of the mobile server 106, 110. The image may be taken before the cruise ship 104 leaves port, the airplane 108 takes off from the airport, or before the mobile gaming establishment begins its journey. The image signature may then be compared to the image signature stored in the authentication database 114.

If the mobile gaming server 106, 110 is not authenticated or is otherwise determined to have been hacked, breached or manipulated, the mobile gaming device 106, 110 may be disabled or shut down. In one embodiment, the data on the mobile gaming server 106, 110 may be deleted and all data re-downloaded. In another embodiment, the gaming establishment may have another server (e.g. a back-up server that is pre-authenticated) to use while the original mobile server is being serviced or otherwise disabled.

FIGS. 2A and 2B illustrate an example method for authenticating a mobile server. The method 200 may begin with assigning authentication identifiers to at least one mobile server at 202. The authentication identifiers may be any identifier that is able to authenticate the mobile server using any known authentication method. For example, the authentication identifier may be a digital certificate, operating software's digital signatures, unalterable unique identifier stored in read-only memory (ROM), the unalterable ID of a portable intermediary trusted device attached to the mobile server 106, 110, an image of the hard drive of the mobile server (the image taken before the mobile gaming establishment begins its journey), and the like. The portable intermediary trusted device may be, for example, the portable intermediary trusted device described in related U.S. patent application Ser. No. 13/833,116, filed Mar. 15, 2013, entitled "PORTABLE INTERMEDIARY TRUSTED DEVICE," which is hereby incorporated by reference herein in its entirety for all purposes. The authentication identifiers may be stored in a database, such as authentication database 114 illustrated in FIG. 1.

The location of the at least one mobile server may be determined at 204. The location may be determined by any authentication server, such as authentication server 112 illustrated in FIG. 1. Any known location methods may be used to locate the mobile server such as the use of global positioning satellites, cellular triangulations or trilaterations, Wifi triangulation, RF fingerprint, or any other known methods.

The at least one mobile servers may be periodically authenticated at 206. The location of the mobile servers may determine how the authentication server communicates with the mobile servers. For example, if authentication server determines that the mobile server is in international waters and/or a location too far from authentication server, authentication server 112 may use satellites to communicate with the mobile servers. In another example, the authentication server 112 may determine that the mobile server is 15 miles away from the nearest WiMax wireless station, a distance that is well within the WiMax station's range. Authentication server 112 may choose to use that WiMax station. In yet another example, if authentication server determines that the mobile server is local (e.g. in a parked bus, a ship docked at port, an airplane landed and/or taxied at an airport, and the like) and/or not located far from authentication server, authentication server may use wireless connections to communicate with the mobile servers.

Mobile servers may be periodically authenticated to ensure the servers are not hacked, breached, or otherwise manipulated. Mobile servers may be authenticated every 5-30 seconds, minute, hour, day, or at any other desired time interval.

If the at least one mobile server is authenticated at 208, a determination of whether to end the authentication is made at 212. Authentication of the mobile servers may end based on any criteria. For example, if the cruise ship is docked at its final destination and the game servers are no longer in use, the authentication may end at 212. In another example, if the airplane has landed at its final destination, the authentication may end at 212.

If the mobile server is not authenticated at 208, the mobile server may be shut down or otherwise disabled at 210. For example, if the digital signature for a software module received from the mobile server does not match the digital signature stored in the authentication server, the mobile server may be disabled at 210.

FIG. 2B is another embodiment of the authentication process. The method 250 begins with assigning the authentication identifiers at 252, to one or more mobile servers. After that, a trusted software image of the operating applications may be loaded onto the mobile server. At 254, an operating lease may be granted to the authenticated mobile server, and subsequently activated. An operating lease is a contract to allow the mobile servers to operate. Once authenticated, the mobile servers 106,110 may be granted a license to operate (the operating lease) over a period of time (e.g., 24 hours), or over a territorial and/or regional location (e.g., on international waters), or a combination of both. Once expired, the mobile servers 106, 110 may need to be authenticated again before the operating lease is renewed. The operating lease may simply be a digital certificate residing on the mobile servers 106, 110 that is digitally signed (e.g., using public-private key cryptographic technology) by a trusted entity such as a gaming control board, a manufacturer of the mobile server, a certifying test agency, and the like. The digital certificate binds the ID of the mobile server with a new expiration date, and may conform to the ITU-T standard X.509, which specifies a certificate format that is known in the art.

Once activated, the mobile server's activities can be tracked at 256. Operating parameters such as the location of the servers, up time, transactions conducted, and the like will be recorded in a database. At 258, the operating lease term may be verified to determine whether the lease has expired. For example, if the time elapsed since activation has exceeded the contracted duration allowed in the lease, or the location of the mobile server is outside the allowed territory, region, terrestrial, and/or geo-fence, or both, then the lease is deemed expired, and an authentication is initiated at 260. If not, the authentication server can return to tracking the activities of the at least one mobile server at 256.

If it is determined, at 260, that an authentication operation is required, the authentication server may verify the authenticity of the mobile server at 262. If it is determined, at 262, that the mobile server is authentic and that trusted applications have not been altered, the operating lease may be renewed at step 264, and the method returns to step 256. If it is determined, at 262, that the authentication process failed, a determination of whether to switch to a back-up mobile server may be made at 268. If a switch to a back-up mobile server is made at 268, the method may return to step 254. The determination of whether to switch to a back-up mobile server may be based on various criteria such as whether there are any previously authenticated back-up servers, whether the back-up servers have valid operating lease, and the like.

If it is determined to not switch to back-up server at 268, the authentication server may shut down the failed mobile server at 266 and the method 250 may end. To maintain the continuity of the operation, a back-up mobile server, that was previously authenticated, may be brought online at 268, and a new lease may be granted and activated for the back-up mobile server. The failed mobile server may be quarantined, or reformatted, or re-imaged, and a new back-up mobile server is created either from yet another back-up server or the reformatted failed server.

FIG. 3 illustrates an example authentication of a mobile server. Initially, when the mobile establishment, such as cruise ship 304 or airplane 302, is stationary before beginning its journey, authentication identifiers for each of the mobile servers 310, 312 may be obtained by authentication server 306. Authentication identifiers may be, for example, a digital certificate, the operating software's digital signatures, unalterable unique identifier stored in read-only memory (ROM), the unalterable ID of a portable intermediary trusted device attached to the mobile server 310, 312, a unique identifier, an image of the hard drive of the mobile server, and the like. The portable intermediary trusted device may be, for example, the portable intermediary trusted device described in related U.S. patent application Ser. No. 13/833,116, filed Mar. 15, 2013, entitled "PORTABLE INTERMEDIARY TRUSTED DEVICE," which is hereby incorporated by reference herein in its entirety for all purposes. The authentication identifiers may be any identifier that is able to authenticate the mobile server 310, 312 using any known authentication method. The authentication identifiers may be stored in a database, such as authentication database 114 illustrated in FIG. 1.

The location of the mobile servers 310, 312 may be determined by the authentication server 306. Determination of the location may indicate whether the mobile gaming establishment 302, 304 has left its beginning destination 314, 316 or is still at the starting destination 314, 316. If the mobile gaming establishment 322, 3320 has left its starting destination 314, 316 along route "A", a determination of the location mobile server 310, 312 may be used to determine how to communicate with the mobile server 310, 312. For example, if the location of the mobile servers 324, 326 is located close to land 300 and/or the authentication server 306, authentication server 306 may communicate with the mobile servers 324, 326 via wireless methods. Wireless connections may be any known wireless methods such as a 3G wireless technology, 4G wireless technology, Bluetooth, wireless universal serial bus, WiMax, IEEE 802.11x, LTE, or 802.16 technology, radio frequency, narrow-beam infrared (IR) sensor, point-to-point microwave communication, WiFi, or any other known wireless methods. In one embodiment, the authentication server 306 may be land-based and fixed to a regional, territorial, and/or terrestrial location. In another embodiment, the authentication server 306 may be housed in the same mobile vessel as the gaming servers 310, 312.

However, as mobile establishments 328, 330 are proceeding along route "A" and become further away from the land 300 and/or authentication server 306, authentication sever 306 may need to communicate with mobile servers 332, 334 using known long distance WiMax or satellite methods.

Once mobile gaming establishments 302, 304 leave their starting destination 314, 316, the mobile servers 324, 326, 332, 334 may be periodically authenticated by the authentication server 306. Mobile servers 324, 326, 332, 334 may be periodically authenticated to ensure the servers are not hacked, breached, or otherwise manipulated. Mobile servers 324, 326, 332, 334 may be authenticated every 5-30 seconds, minute, hour, day, or at any other desired time interval and/or time interval allowed by the operating lease.

If the mobile server 324, 326, 332, 334 is authenticated, no action is taken. However, if the mobile server 324, 326, 332, 334 is not authenticated, the mobile server 324, 326, 332, 334 may be shut down or otherwise disabled and a backup mobile server, that was previously authenticated, maybe brought up as a substitution for the failed mobile server. For example, if the digital signature for a software module received from the mobile server 324, 326, 332, 334 does not match the digital signature of the corresponding trusted software stored in the authentication server 306, the mobile server 324, 326, 332, 334 may be disabled.

FIG. 4 illustrates an exemplary computer system 400 suitable for use with at least one embodiment of the invention. The methods, processes and/or graphical user interfaces discussed above can be provided by a computer system. The computer system 400 includes a display monitor 402 having a single or multi-screen display 404 (or multiple displays), a cabinet 406, a keyboard 408, and a mouse 410. The mouse 410 is representative of one type of pointing device. The cabinet 406 houses a processing unit (or processor), system memory and a hard drive (not shown). The cabinet 406 also houses a drive 412, such as a DVD, CD-ROM or floppy drive. The drive 412 can also be a removable hard drive, a Flash or EEPROM device, etc. Regardless, the drive 412 may be utilized to store and retrieve software programs incorporating computer code that implements some or all aspects of the invention, data for use with the invention, and the like. Although CD-ROM 414 is shown as an exemplary computer readable storage medium, other computer readable storage media including floppy disk, tape, Flash or EEPROM memory, memory card, system memory, and hard drive may be utilized. In one implementation, a software program for the computer system 400 is provided in the system memory, the hard drive, the drive 412, the CD-ROM 414 or other computer readable storage medium and serves to incorporate the computer code that implements some or all aspects of the invention.

FIG. 5 is a block diagram of an example computing system. The computing system 500 may be the gaming server 106, 110, authentication server 112 illustrated in FIG. 1, or any other server or computing device used to carry out the various embodiments disclosed herein. The computing system 500 may include a processor 502 that pertains to a microprocessor or controller for controlling the overall operation of the computing system 500. The computing system 500 may store any type of data and information as discussed above in a file system 504 and a cache 506. The file system 504 is, typically, a storage disk or a plurality of disks. The file system 504 typically provides high capacity storage capability for the computing system 500. However, since the access time to the file system 504 is relatively slow, the computing system 500 can also include a cache 506. The cache 506 is, for example, Random-Access Memory (RAM)

provided by semiconductor memory. The relative access time to the cache 506 is substantially shorter than for the file system 504. However, the cache 506 does not have the large storage capacity of the file system 504. Further, the file system 504, when active, consumes more power than does the cache 506. The computing system 500 also includes a RAM 520 and a Read-Only Memory (ROM) 522. The ROM 522 can store programs, utilities or processes to be executed in a non-volatile manner. The RAM 520 provides volatile data storage, such as for the cache 506.

The computing system 500 also includes a user input device 508 that allows a user of the computing system 500 to interact with the computing system 500. For example, the user input device 508 can take a variety of forms, such as a button, keypad, dial, and the like. Still further, the computing system 500 includes a display 510 (screen display) that can be controlled by the processor 502 to display information, such as a list of upcoming appointments, to the user. A data bus 511 can facilitate data transfer between at least the file system 504, the cache 506, the processor 502, and the CODEC 512.

In one embodiment, the computing system 500 serves to store a plurality of authentication information, mobile server data, and the like in the file system 504. When a user desires to have the computing system display a particular advertisement, a list of the various third party advertisers may be displayed on the display 510.

The computing system 500 may also include a network/bus interface 516 that couples to a data link 518. The data link 518 allows the computing system 500 to couple to a host computer or data network, such as the Internet. The data link 518 can be provided over a wired connection or a wireless connection. In the case of a wireless connection, the network/bus interface 516 can include a wireless transceiver.

While embodiments and applications of this invention have been shown and described, it would be apparent to those skilled in the art having the benefit of this disclosure that many more modifications than mentioned above are possible without departing from the inventive concepts herein. For example, the authentication server maybe regional, territorial, and/or terrestrial (e.g., fixed WiMax towers along the ocean shore, tracking the location of a cruise ship), or the authentication server maybe mobile alongside the mobile server as well (e.g., authentication server is onboard the cruise ship).

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system for authenticating mobile servers comprising:
at least one mobile server configured to support games of chance; and
an authentication server configured to:
assign authentication identifiers to each of the at least one mobile server and at least one backup mobile server;
pre-authenticate the at least one backup mobile server by granting an operating lease to the at least one backup mobile server; and
authenticate the at least one mobile server for a predetermined period of time, a predetermined geographical area, or a predetermined period of time and a predetermined geographical area, wherein, when authenticated, the at least one mobile server supports the games of chance and, when not authenticated, the at least one mobile server limits or prevents performance of the games of chance.

2. The system of claim 1, wherein the authentication server is further configured to activate the at least one backup mobile server when the at least one mobile server is not able to be authenticated.

3. The system of claim 2, wherein the authentication server is further configured to shut down the at least one mobile server when the at least one mobile server is not able to be authenticated.

4. The system of claim 1, further comprising a database configured to record activities of the at least one mobile server.

5. The system of claim 1, wherein the authentication server is further configured to pre-authenticate the at least one backup mobile server by determining a location of the at least one backup mobile server and periodically authenticating the at least one backup mobile server.

6. The system of claim 1, wherein the authentication server is further configured to activate the at least one backup mobile server by activating the operating lease.

7. A method for authenticating mobile servers to support games of chance comprising:
assigning authentication identifiers to at least one mobile server and at least one backup mobile server;
pre-authenticating the at least one backup mobile server;
authenticating the at least one mobile server for a predetermined period of time, a predetermined geographical area, or a predetermined period of time and a predetermined geographical area, wherein the authenticating the at least one mobile server comprises granting and activating an operating lease of the at least one mobile server, wherein, when authenticated, the at least one mobile server supports the games of chance and, when not authenticated, the at least one mobile server limits or prevents performance of the games of chance; and
tracking activities of the at least one mobile server.

8. The method of claim 7, the pre-authenticating further comprising pre-authenticating the at least one backup mobile server by determining a location of the at least one backup mobile server and periodically authenticating the at least one backup mobile server.

9. The method of claim 7, wherein authenticating the at least one mobile server is at least for the predetermined period of time and the method further comprises re-authenticating the at least one mobile server after the predetermined period of time or after the operating lease expires, and activating the at least one backup mobile server when the at least one mobile server is not able to be re-authenticated.

10. The method of claim 7, wherein the pre-authenticating the at least one backup mobile server further comprises granting a second operating lease to the at least one backup mobile server.

11. The method of claim 7, further comprising:
verifying the authenticating of the at least one mobile server by checking whether the at least one mobile server is within the predetermined geographical area when the at least one mobile server is authenticated for at least the predetermined geographical area and whether the predetermined period of time has not elapsed when the at least one mobile server is authenticated for at least the predetermined period of time; and
re-authenticating the at least one mobile server if the predetermined period of time has elapsed when the at least one mobile server is authenticated for at least the predetermined period of time or if the at least one mobile server is outside the predetermined geographical area when the at least one mobile server is authenticated for at least the predetermined geographical area.

12. The method of claim 7, wherein the tracking of the activities of the at least one mobile server comprises recording one or more items selected from the group of a location of the at least one mobile server, up-time of the at least one mobile server, and transactions conducted by the at least one mobile server.

13. A non-transitory computer-readable medium for authenticating mobile servers, the non-transitory computer-readable medium storing instructions which, when executed by one or more processors, cause the one or more processors to:
assign authentication identifiers to at least one mobile server and at least one backup mobile server;
pre-authenticate the at least one backup mobile server by granting an operating lease to the at least one mobile backup server;
authenticate the at least one mobile server for a predetermined period of time, a predetermined geographical area, or a predetermined period of time and a predetermined geographical area by granting and activating a second operating lease to the at least one mobile server, wherein, when authenticated, the at least one mobile server supports games of chance and, when not authenticated, the at least one mobile server limits or prevents use of the games of chance; and
verify at least one of a location or the authentication identifier of the at least one mobile server after the predetermined period of time elapses or after an operating lease expires.

14. The non-transitory computer-readable medium of claim 13, the non-transitory computer-readable medium storing further instructions which, when executed by the one or more processors, further cause the one or more processors to pre-authenticate the at least one backup mobile server by determining at least a location of the at least one backup mobile server and then periodically authenticate the at least one backup mobile server.

15. The non-transitory computer-readable medium of claim 13, the non-transitory computer-readable medium storing further instructions which, when executed by the one or more processors, further cause the one or more processors to: re-authenticate the at least one mobile server if the predetermined period of time has elapsed, the at least one mobile server is outside the predetermined geographical area, or the operating lease has expired.

16. The non-transitory computer-readable medium of claim 13, the non-transitory computer-readable medium storing further instructions which, when executed by the one or more processors, further cause the one or more processors to track activities of the at least one mobile server by recording one or more items selected from the group of a location of the at least one mobile server, up-time of the at least one mobile server, and transactions conducted by the at least one mobile server.

17. A non-transitory computer-readable medium for authenticating mobile servers, the non-transitory computer-readable medium storing instructions which, when executed by one or more processors, cause the one or more processors to:
assign an authentication identifiers to at least one mobile server and at least one backup mobile server;
pre-authenticate the at least one backup mobile server;
authenticate the at least one mobile server for a predetermined period of time, a predetermined geographical area, or a predetermined period of time and a predetermined geographical area, wherein, when authenticated, the at least one mobile server supports games of chance and, when not authenticated, the at least one mobile server limits or prevents performance of the games of chance;
verify at least one of a location or the authentication identifier of the at least one mobile server after the predetermined period of time elapses or after an operating lease expires; and
activate a second operating lease of the at least one mobile backup server if the at least one mobile server cannot be authenticated or re-authenticated.

* * * * *